US007511441B2

(12) United States Patent
Onozawa et al.

(10) Patent No.: US 7,511,441 B2
(45) Date of Patent: Mar. 31, 2009

(54) SEMICONDUCTOR INTEGRATED CIRCUIT, DRIVE CIRCUIT, AND PLASMA DISPLAY APPARATUS

(75) Inventors: Makoto Onozawa, Kawasaki (JP); Tomokatsu Kishi, Kawasaki (JP); Yoshinori Okada, Kawasaki (JP); Masatoshi Hira, Kawasaki (JP)

(73) Assignee: Fujitsu Hitachi Plasma Display Limited, Kawasaki (JP)

( * ) Notice: Subject to any disclaimer, the term of this patent is extended or adjusted under 35 U.S.C. 154(b) by 784 days.

(21) Appl. No.: 11/089,000

(22) Filed: Mar. 24, 2005

(65) Prior Publication Data

US 2005/0285819 A1 Dec. 29, 2005

(30) Foreign Application Priority Data

Jun. 28, 2004 (JP) ............................ 2004-189766
Dec. 7, 2004 (JP) ............................ 2004-353595

(51) Int. Cl.
*H02P 6/06* (2006.01)

(52) U.S. Cl. ............................ 318/400.06; 318/400.1; 318/400.13

(58) Field of Classification Search ............ 318/400.06, 318/400.1, 400.13, 400.17; 360/46
See application file for complete search history.

(56) References Cited

U.S. PATENT DOCUMENTS 5,434,717 A * 7/1995 Yoshinaga et al. ............ 360/46
6,373,452 B1 4/2002 Ishii et al.
2002/0097203 A1 7/2002 Onozawa et al.
2003/0197696 A1 10/2003 Onozawa et al.
2005/0213189 A1 * 9/2005 Schroeder .................. 359/291

FOREIGN PATENT DOCUMENTS

EP 1139323 10/2001
JP 2002-165436 6/2002

* cited by examiner

*Primary Examiner*—Karen Masih
(74) *Attorney, Agent, or Firm*—Staas & Halsey LLP

(57) ABSTRACT

A semiconductor integrated circuit capable of reducing the influence of the difference in ambient temperature etc. and realizing a stable phase adjustment circuit has been disclosed. The semiconductor integrated circuit comprises a delay time adjustment circuit for delaying the rising edge or the falling edge of an input signal and changing the amount of delay, a comparison circuit for comparing an output signal from the delay time adjustment circuit with a predetermined voltage, a high-level shift circuit for shifting an output signal from the comparison circuit into a signal on the basis of an output reference voltage, and an output amplifier circuit for amplifying an output signal from the high-level shift circuit and outputting a signal for driving the semiconductor device, wherein the delay time adjustment circuit, the comparison circuit, the high-level shift circuit, and the output amplifier circuit are formed on a single chip.

51 Claims, 32 Drawing Sheets

SEMICONDUCTOR INTEGRATED CIRCUIT, DRIVE CIRCUIT, AND PLASMA DISPLAY APPARATUS

CROSS REFERENCE TO RELATED APPLICATION

This application is based upon and claims the benefit of priority from the prior Japanese Patent Applications No. 2004-189766, filed on Jun. 28, 2004 and No. 2004-353595, filed on Dec. 7, 2004, the entire contents of which are incorporated herein by reference.

BACKGROUND OF THE INVENTION

The present invention relates to a semiconductor integrated circuit used in a sustain circuit of a plasma display apparatus, to a drive circuit, and to a plasma display apparatus using these circuits.

The plasma display panel (PDP) is a self-emitting-type display has excellent visibility, is thin, and is capable of producing a large display at a high speed. Therefore, it is attracting interest as a display panel and as a replacement for a CRT. As the basic configuration of a PDP is disclosed in, for example, EP 1139323A, a detailed description is not give here but only points that directly relate to the present invention are described below.

In the PDP apparatus, it is necessary to apply a voltage of about 200 V, at the maximum, between display electrodes as a high-frequency sustain pulse and the pulse width is about several microseconds in a PDP apparatus that provides a gradated display using a subfield display method. As a PDP apparatus is driven by a signal having a high voltage and a high frequency, the power consumption thereof is generally large and it is required to save power. Therefore, a circuit, which recovers power being applied between electrodes when a sustain pulse is applied to change the polarity of the voltage to be applied to the electrode, is used and the recovered power is utilized for the application of a sustain pulse. In a power recovery circuit, it is important to efficiently carry out recovery and application of power and, in order to realize high power-recovery efficiency, it is necessary to apply a sustain pulse at an optimum timing.

EP 1139323A describes a configuration in which a phase adjustment circuit is provided in a drive circuit for driving an output semiconductor device in a sustain circuit of a plasma display apparatus so that the timing of application of a sustain pulse is adjustable. FIG. 1 is a diagram showing the conventional configuration of a sustain circuit of the plasma display apparatus described in EP 1139323A and FIG. 2 is a diagram showing the operation timing. This circuit is a sustain circuit having a power recovery circuit in which a recovery path through which power is recovered and an application path through which accumulated power is applied are separated. By the way, a circuit for generating signals V1 to V4 is also provided, but is omitted here. Reference symbol Cp denotes a drive capacitor of a display cell formed by the X electrode and the Y electrode of the PDP. The sustain circuit shown in FIG. 1 is a half bridge circuit driven by connecting the output semiconductor devices (transistors) on the high side and the low side in series. The part composed of output semiconductor devices (transistors) 31 and 33, drive circuits 32 and 34, and first and second phase adjustment circuits 51 and 52 is a basic sustain circuit. The part composed of output semiconductor devices (transistors) 37 and 40, drive circuits 38 and 41, third and fourth phase adjustment circuits 53 and 54, inductance elements 35 and 43, a capacitor 39, and diodes 36 and 42 is a power recovery circuit. The signals V1 and V2 are inputted to the drive circuits 32 and 34 via the first and second phase adjustment circuits 51 and 52, respectively, and signals VG1 and VG2 output therefrom are applied to the gates of the output devices (transistors) 31 and 33. Here, an example, in which a power MOSFET is used as an output semiconductor device (hereinafter, referred to only as an output device in some cases), but an IGBT may be used instead of a power MOSFET.

When the signal V1 is at the "high (H)" level, the output device 31 is turned on (brought into conduction), and a signal at the H level is applied to the electrode. At this time, the signal V2 is at the "low (L)" level and the output device is in the off state (state of cutoff). At the same time when the signal V1 changes to the L level and the output device 31 turns off, the signal V2 changes to the H level, the output device 33 turns on, and the ground level is applied to the electrode.

When the power recovery circuit is present, as shown in FIG. 2, at the time of application of a sustain pulse, before the signal V1 changes to H, the signal V2 changes to L and after the output device 33 turns off, the signal V3 changes to H and the output device 40 turns on, and a resonance circuit is formed by the capacitor 36, the diode 42, the inductance 43, and the capacitor Cp, the power stored in the capacitor 39 is supplied to the electrode, and the potential of the electrode is raised. Immediately before the rise in the potential is completed, the signal V3 changes to L and the output device 40 turns on and, further, the signal V1 changes to H and the output device 31 turns on, and thus the potential of the electrode is fixed to Vs. When the application of a sustain pulse is terminated, the signal V1 first changes to L and after the output device 31 turns off, the signal V4 changes to H and the output device 37 turns on, and a resonance circuit is formed by the capacitor 39, the diode 36, the inductance 35, and the capacitor Cp and the power stored in the capacitor Cp is supplied to the capacitor 39, and thus the voltage of the capacitor 39 is raised. Due to this, the power stored in the capacitor Cp is recovered by the capacitor 39 by means of the sustain pulse applied to the electrode. Immediately before the drop in potential of the electrode is completed, the signal V4 changes to L and the output device 37 turns off, further the signal V2 changes to H and the output device 33 turns on, and thus the potential of the electrode is fixed to the ground. During the sustain discharge period, the above-mentioned action is repeated the same number of times as the number of sustain pulses. Due to the configuration described above, the power consumption accompanying the sustain discharge can be reduced.

In the power recovery circuit, it is important to perform recovery and application of power efficiently and it is required to realize a high power recovery efficiency. The power recovery efficiency is affected by the on/off timing of the output devices 31, 33, 37, and 40. FIG. 3A and FIG. 3B are diagrams for explaining this influence, where FIG. 3A shows a case where the timing of clamp is put forward and FIG. 3B shows a case where the timing of clamp is delayed.

As described above, when a sustain pulse is applied, the output device 40 turns on and the power stored in the capacitor 39 is supplied to the electrode, and immediately before the rise in potential of the electrode is completed, the signal V3 changes to L and the output device 40 turns off and at the same time, the signal V1 changes to H and the output device 31 turns on, and thus the potential of the electrode is fixed (clamped) to Vs. Here, as shown in FIG. 3A, if the output device 31 turns on before the output device 40 turns off, the electrode is connected to the power supply of the voltage Vs while the potential of the electrode is being raised by the power stored in the capacitor 39 because the output device 31 turns on, therefore, the rest of the rise process in potential is carried out by the power from the power supply. This means that part of the power stored in the capacitor 39 is wasted. Similarly, when the application of a sustain pulse is completed, if the output device 33 turns on after the output device 37 turns on and while power is being recovered to the capacitor 39, power is not recovered sufficiently because of clamp to the ground before the power is recovered sufficiently.

Moreover, as shown in FIG. 3B, when a sustain pulse is applied, if the output device 31 turns on after the output device 40 turns off, the rise in potential of the electrode is terminated by the power stored in the capacitor 39 and conversely, after the potential of the electrode begins to fall, the output device 31 turns on to clamp the electrode to the power supply of the voltage Vs, therefore, the fallen potential needs to be raised and excessive power is required accordingly. Similarly, when the application of a sustain pulse is completed, if the output device 33 turns on after the output device 37 turns off, because of clamp to the ground after the once fallen potential begins to rise, the raised potential needs to be lowered and excessive power is required accordingly.

As described above, if the timing of turning on/off of the output devices 31, 33, 37, and 40 in the sustain circuit is shifted, there arises a problem in that the power consumption is increased. The timing of turning on/off of the output devices 31, 33, 37, and 40 is the sum of the timing of change of the signals V1, V2, V3, and V4, the delay time of the drive circuits 32, 34, 38, and 41, and the delay time of the output devices 31, 33, 37, and 40. The timing of change of the signals V1, V2, V3, and V4 can be set relatively highly precisely, but the delay time of the drive circuits 32, 34, 38, and 41 and the delay time of the output devices 31, 33, 37, and 40 vary depending on the variations in the characteristics of the devices to be used. Therefore, the power recovery efficiency of PDP apparatuses differ and the power recovery efficiency is degraded compared to an ideal case, and there arises a problem of an increase in power consumption.

Moreover, if the delay time of the circuit element varies and the shape and timing of the sustain pulse differ from each other, the possibility that the normal operation cannot be carried out becomes stronger. Normally, the difference ΔVs of the operation voltage Vs between the maximum voltage Vs (max) and the minimum voltage (min) is referred to as an operation margin, and if the delay time of the circuit element varies and the shape and timing of the sustain pulse differ from each other, the operation margin ΔVs is reduced. This means that the stability of the operation of the apparatus is reduced.

In an ALIS system PDP apparatus to be described later, no discharge is caused to occur between neighboring electrodes to which the same voltage is applied but, if the timing of application is shifted, a discharge is caused to occur temporarily also in a display line that does not serve to provide a display, wall charges written during the address period are reduced, and there arises a problem in that a normal display cannot be provided.

As described above, there has been a problem in that the delay time of each circuit element in the sustain circuit varies and, in accordance with this, the on/off timing of the sustain pulse is shifted and the shape thereof is altered, the power consumption is increased and malfunctions occur.

Therefore, as shown in FIG. 1, in the previous stage of the drive circuits 32, 34, 38, and 41, the first phase adjustment circuit 51, the second phase adjustment circuit 52, the fourth phase adjustment circuit 54, and the third phase adjustment circuit 53 are provided in order to adjust the timing of the change edge of the sustain pulse to an optimum state. Due to this, the power recovery circuit can be operated efficiently, therefore, power consumption can be reduced. Moreover, the on/off timing of the sustain pulse to be applied form each sustain circuit is brought into an optimum condition to each other, therefore malfunctions and erroneous discharges are unlikely to occur.

SUMMARY OF THE INVENTION

EP 1139323A describes various specific examples of phase adjustment circuits to be provided in the previous stage of each drive circuit (FIG. 11 to FIG. 13). Among the described specific examples, configurations constituted of a resistor (including a variable resistor) and a capacitor (FIG. 11(A) and FIG. 11(E)) are practical if the circuit size, the cost, etc., are taken into consideration. When these configurations are realized, it is common that the phase adjustment circuit is constituted of discrete parts different from the drive circuit and the drive circuit is constituted of semiconductor integrated circuits etc. in order to facilitate the adjustment and design modification of the resistors and capacitors.

However, the manufacture process of the drive circuit constituted of semiconductor integrated circuits differ from that of the phase adjustment circuit constituted of resistors and capacitors, which are discrete parts, therefore, the temperature characteristic etc. is not necessarily be the same. Because of this, even if the optimum phase adjustment is done at a specific temperature, there may occur deviation in the phase adjustment under other temperature conditions due to the difference in ambient temperature.

Moreover, the sustain pulse of the plasma display apparatus has a voltage as high as a hundred and tens of volts and the output semiconductor device outputs such a high voltage. Because of this, the drive circuit level-converts a signal from a logic circuit operating at 3 to 5 V to generate a signal for driving the output semiconductor device. When there exist a low-voltage circuit and a high-voltage circuit, the noises produced in the high-voltage circuit have relatively large amplitudes in the low-voltage circuit, resulting in a strong influence. Therefore, there may be a case where the low-voltage circuit and the high-voltage circuit are completely separated, including the power supply, and an optical transmission circuit that utilizes a photocoupler is used to transfer signals between the low-voltage circuit and the high-voltage circuit. JP 2002165436A describes a configuration in which a timing adjustment circuit is provided in a high-voltage semiconductor switch circuit formed of a photocoupler and discrete parts.

Also, when the pre-drive circuit that utilizes the above-mentioned optical transmission circuit is used in the sustain circuit in the plasma display apparatus, a problem of the variation in the delay time of each part arises. Moreover, when a delay time adjustment circuit constituted of discrete parts is configured by an external circuit of the drive circuit formed of semiconductor integrated circuits, the difference in the temperature characteristic causes a problem as described above.

When a deviation occurs in the state of an optimally adjusted phase adjustment as described above in the drive circuit for driving the output semiconductor device in the sustain circuit in the plasma display apparatus, the power consumption increases or the drive margin of the plasma display apparatus decreases as described in EP 1139323A.

An object of the present invention is to provide a semiconductor integrated circuit capable of reducing the influence of difference in ambient temperature and realizing a stable phase adjustment circuit.

Moreover, another object of the present invention is to provide a plasma display apparatus capable of reducing the influence of the difference in ambient temperature and in which an increase in power consumption due to the change in temperature and a decrease in drive margin are small.

In order to attain the first object mentioned above, a semiconductor integrated circuit according to a first aspect of the present invention is characterized by comprising a delay time adjustment circuit for delaying the rising edge or the falling edge of an input signal and changing the amount of delay, a comparison circuit for comparing an output signal from the delay time adjustment circuit with a predetermined voltage, a high-level shift circuit for shifting an output signal from the comparison circuit into a signal on the basis of an output reference voltage, and an output amplifier circuit for amplifying an output signal from the high-level shift circuit and outputting a signal for driving a semiconductor device such as power MOSFET or IGBT, wherein the delay time adjustment circuit, the comparison circuit, the high-level shift circuit, and the output amplifier circuit are formed on a single chip.

A semiconductor integrated circuit according to a second aspect of the present invention is characterized by comprising a single package containing a first semiconductor chip having an input terminal and a light emitting device for converting an electric signal inputted from the input terminal into a light signal and a second semiconductor chip having a light receiving device for converting the light signal emitted from the light emitting device into an electric signal and an amplifier circuit for amplifying the electric signal obtained from the light receiving device, wherein the second semiconductor chip comprises a delay time adjustment circuit for delaying the rising edge or the falling edge of the electric signal obtained from the light receiving device to adjust a delay time.

Moreover, in order to attain the second object mentioned above, a plasma display apparatus of the present invention is characterized by comprising a plurality of first electrodes and a plurality of second electrodes arranged adjacently by turns, a first electrode drive circuit having a semiconductor device for applying a discharge voltage to the plurality of first electrodes, and a second electrode drive circuit having a semiconductor device for applying a discharge voltage to the plurality of second electrodes, wherein a discharge is caused to occur between neighboring ones of the first electrode and second electrodes and the first electrode drive circuit or the second electrode drive circuit uses the semiconductor integrated circuit described above as a drive circuit (a sustain circuit) for driving the semiconductor device.

In the semiconductor integrated circuit according to the first aspect of the present invention, the delay time adjustment circuit is formed on a single chip together with the comparison circuit, the high-level shift circuit, and the output amplifier circuit, therefore, the temperature characteristic of the delay time of the delay time adjustment circuit can be made equal to the temperature characteristic of the delay time of other circuits. Therefore, if the delay time of each semiconductor integrated circuit is set to an optimum state, no difference occurs between delay times of each semiconductor integrated circuit because the delay time in each part changes with the same characteristic even when the temperature changes.

Similarly, in the semiconductor integrated circuit according to the second aspect of the present invention, the first semiconductor chip having the input terminal and the light emitting device and the second semiconductor chip having the light receiving device and the amplifier circuit are contained in a single package and the second semiconductor chip comprises a delay time adjustment circuit capable of delaying the rising edge or the falling edge of an electric signal obtained from the light receiving element to adjust a delay time and, therefore, the total delay time can be adjusted to a predetermined value despite the variations in the delay time of each device and circuit and the temperature characteristic of the delay time of each device and circuit can be the same, whereby no difference occurs between delay times of each semiconductor integrated circuit because the delay time in each part changes with the same characteristic even when temperature changes.

As the plasma display apparatus of the present invention uses the above-mentioned semiconductor integrated circuit as a drive circuit for driving an output semiconductor device in a sustain circuit, the phase of a drive pulse to be supplied to the output semiconductor device in the sustain circuit can be maintained in a proper state even when the ambient temperature changes. Therefore, an increase in power consumption and a decrease in drive margin caused by the shift in the phase of the drive pulse to be supplied to the output semiconductor device can be prevented.

BRIEF DESCRIPTION OF THE DRAWINGS

The features and advantages of the invention will be more clearly understood form the following description, taken in conjunction with the accompanying drawings in which.

DESCRIPTION OF THE PREFERRED EMBODIMENTS

Figure 4:
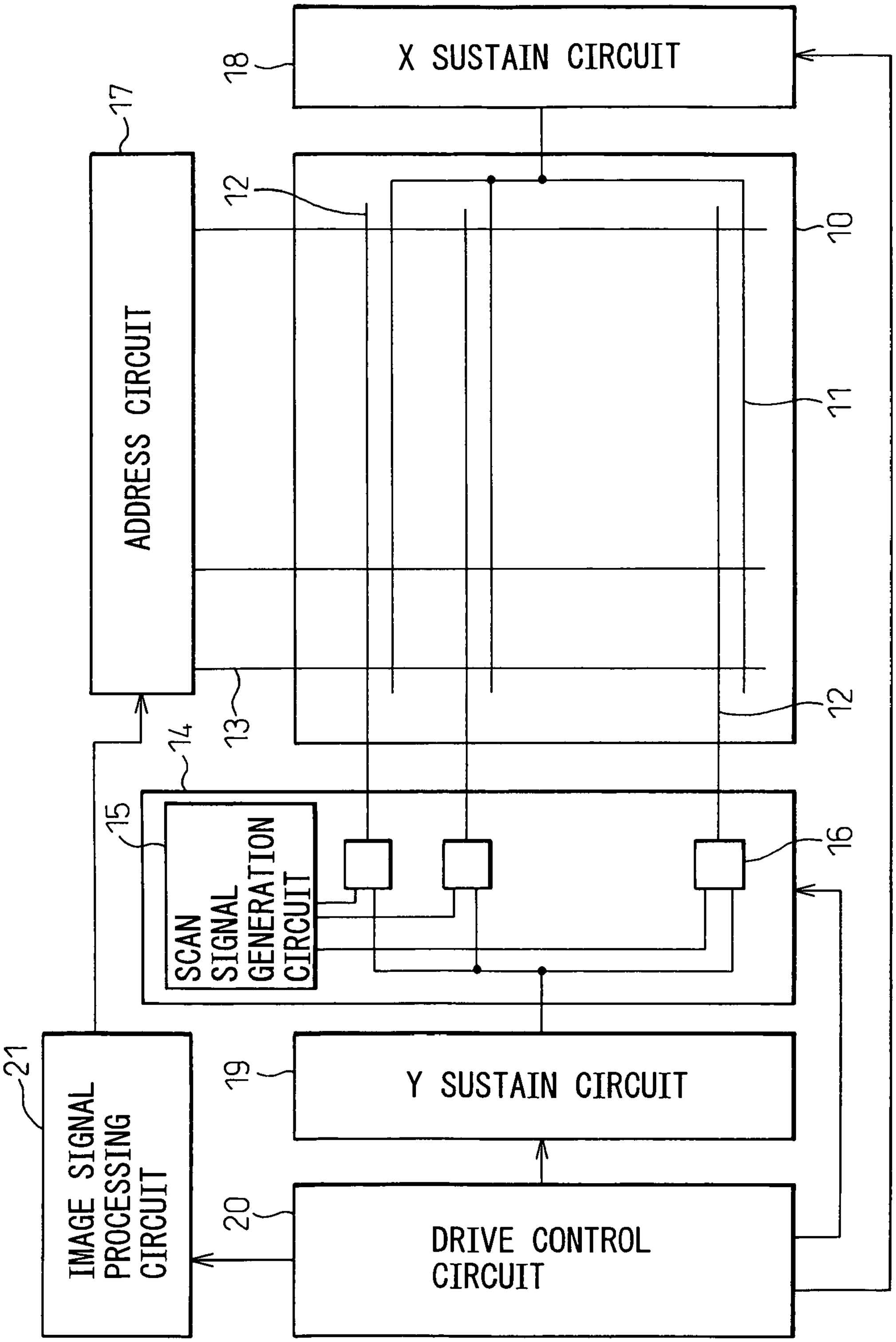
FIG. 4 is a block diagram showing the general configuration of a PDP apparatus in a first embodiment of the present invention.

FIG. 4 is a general block diagram of a PDP apparatus in a first embodiment of the present invention. In a PDP 10, n first (X) electrodes and n second (Y) electrodes 12 are arranged adjacently by turns to form n pairs of X electrode 11 and Y electrode 12, and a discharge is caused to occur between the X electrode 11 and the Y electrode 12 of each pair to emit light to provide a display. The Y electrode and the X electrode are referred to as the display electrode, or the sustain electrode in some cases. Address electrodes 13 are provided in the direction perpendicular to the direction in which the display electrodes extend and a display cell is formed at the intersection of the X electrode 11 and the Y electrode 12.

The Y electrodes 12 are connected to a scan driver 14. The scan drive 14 is provided with switches 16, the number of which being equal to that of Y electrodes, and during the address period, the switches 16 are switched over so that a scan pulse from a scan signal generation circuit 15 is applied sequentially and, during the sustain discharge period, the switches 16 are switched over so that a sustain pulse from a Y sustain circuit 19 is applied simultaneously. The X electrodes 11 are connected in common to an X sustain circuit 18 and the address electrodes 13 are connected to an address driver 17. After converting an image signal into a format suitable to the operation in the PDP apparatus, an image signal processing circuit 21 supplies the image signal to the address circuit 17. A drive control circuit 20 generates a signal to control each part of the PDP apparatus and supplies the signal thereto.

Figure 5:
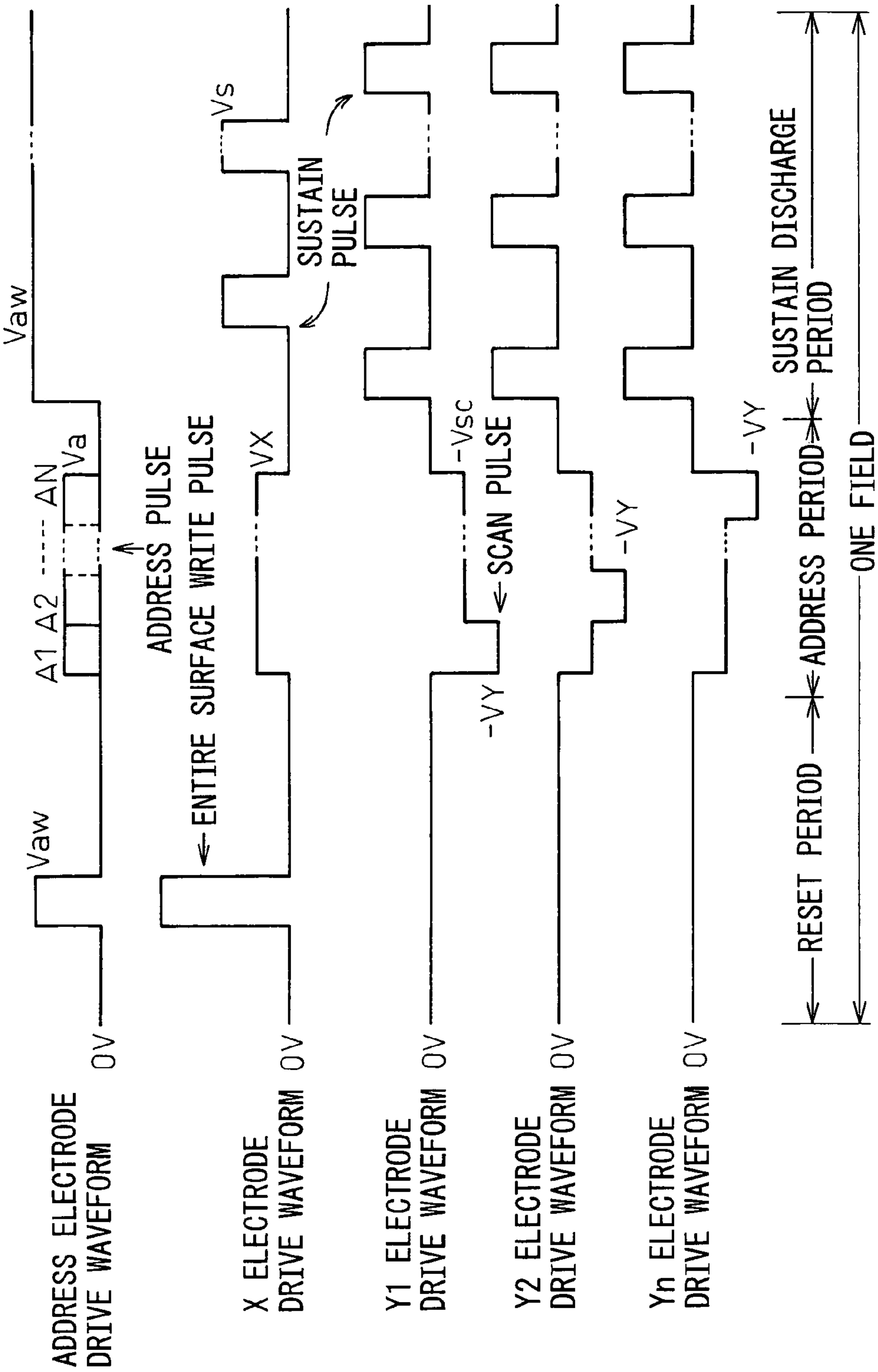
FIG. 5 is a diagram showing drive waveforms in the PDP apparatus in the first embodiment.

FIG. 5 is a time chart showing drive waveforms of the PDP apparatus in the first embodiment. The PDP apparatus produces a display while refreshing a display frame for each predetermined period and a display period is referred to as a field. When a gradated display is produced, a field is further divided into plural subfields and subfields to be lit are combined for each display cell. Each subfield comprises a reset period during which all the display cells are initialized, an address period during which all the display cell are brought into a state corresponding to an image to be displayed, and a sustain discharge period during which each display is lit according to the set state. During the sustain discharge period, a sustain pulse is applied alternately to the X electrode and the Y electrode and a sustain discharge is caused to occur in a display cell set so as to emit light during the address period, and this light emission is used to produce a display.

In the PDP apparatus, it is necessary to apply a voltage of about 200 V at the maximum as a high frequency pulse between electrodes and, in particular, the width of a pulse is several microseconds when a gradated display is produced by combination of subfields. The PDP apparatus is driven by such a signal having a high voltage and a high frequency, the power consumption is large in general and power-saving measures are demanded. Because of this, a three-electrode type display unit employs a configuration in which two inductances are provided on the Y electrode side, one for forming a recovery path to recover the power being applied during the period of switchover of the Y electrode from the high potential to the low potential and the other for forming an application path to apply the power accumulated during the period of switchover of the Y electrode from the low potential to the high potential. The X sustain circuit 18 and the Y sustain circuit 19 in the present embodiment also have such a power recovery circuit.

Figure 6:
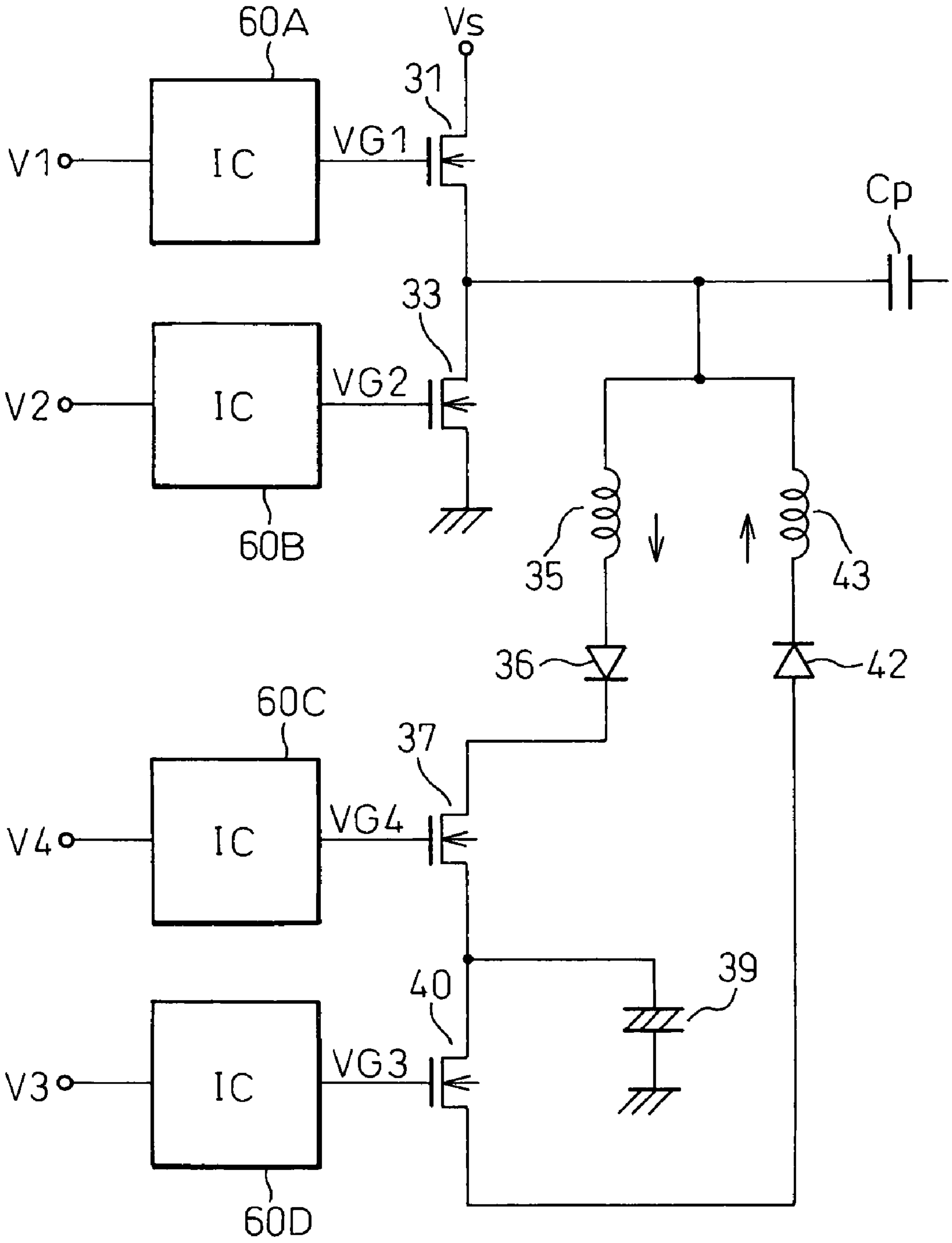
FIG. 6 is a diagram showing the configuration of a sustain circuit in the first embodiment.

FIG. 6 is a diagram showing the configuration of the X sustain circuit 18 or the Y sustain circuit 19 in the present embodiment. Here, only one of the configurations of the X sustain circuit 18 and the Y sustain circuit 19 is shown. The other configuration may be a similar one or a different one, for example, a configuration comprising no power recovery circuit or a configuration similar to a conventional one may be acceptable.

Figure 1:
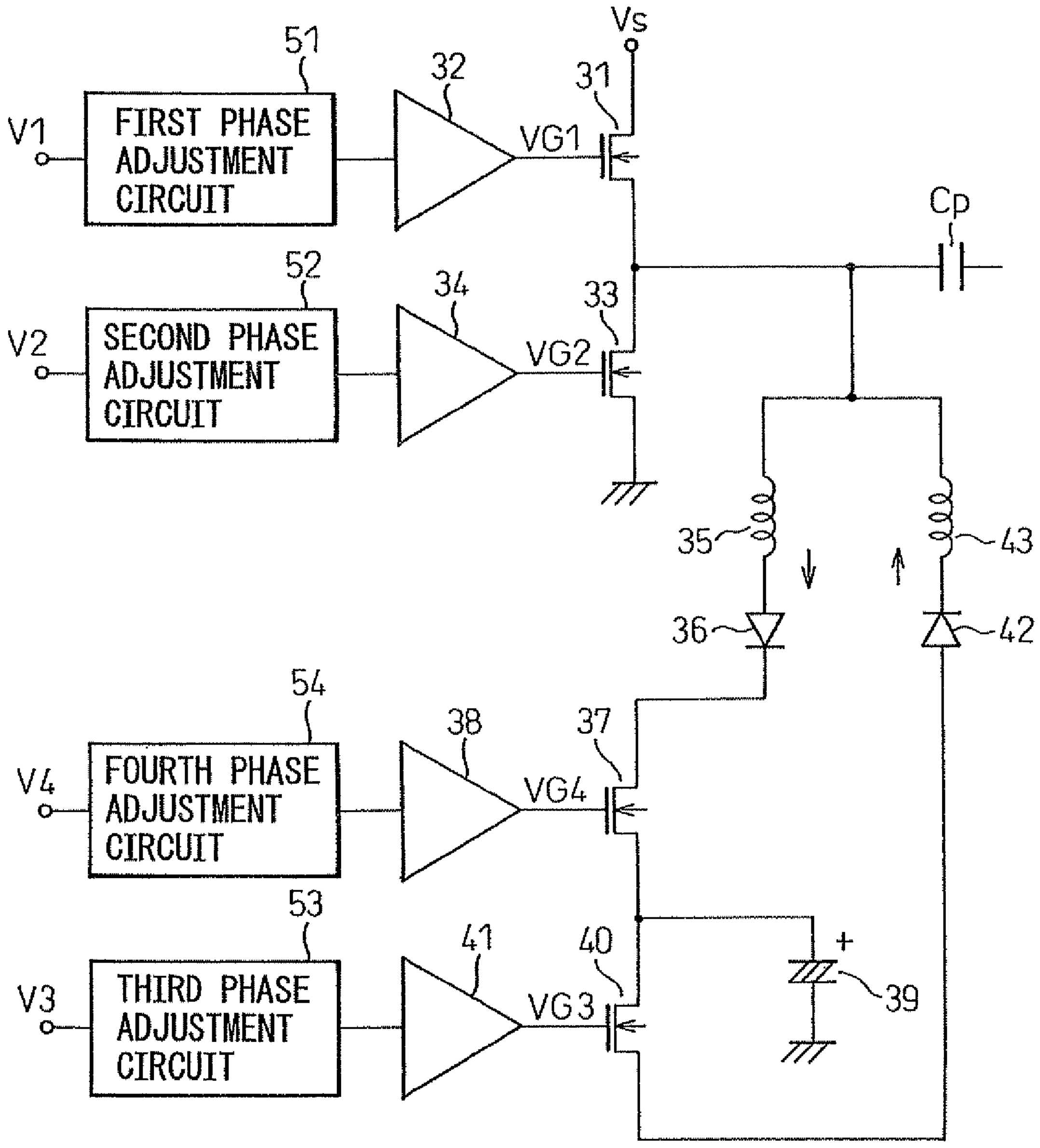
Prior Art FIG.1
FIG. 1 is a diagram showing the configuration of a conventional case of a sustain circuit in a plasma display apparatus (PDP).
Figure 2:
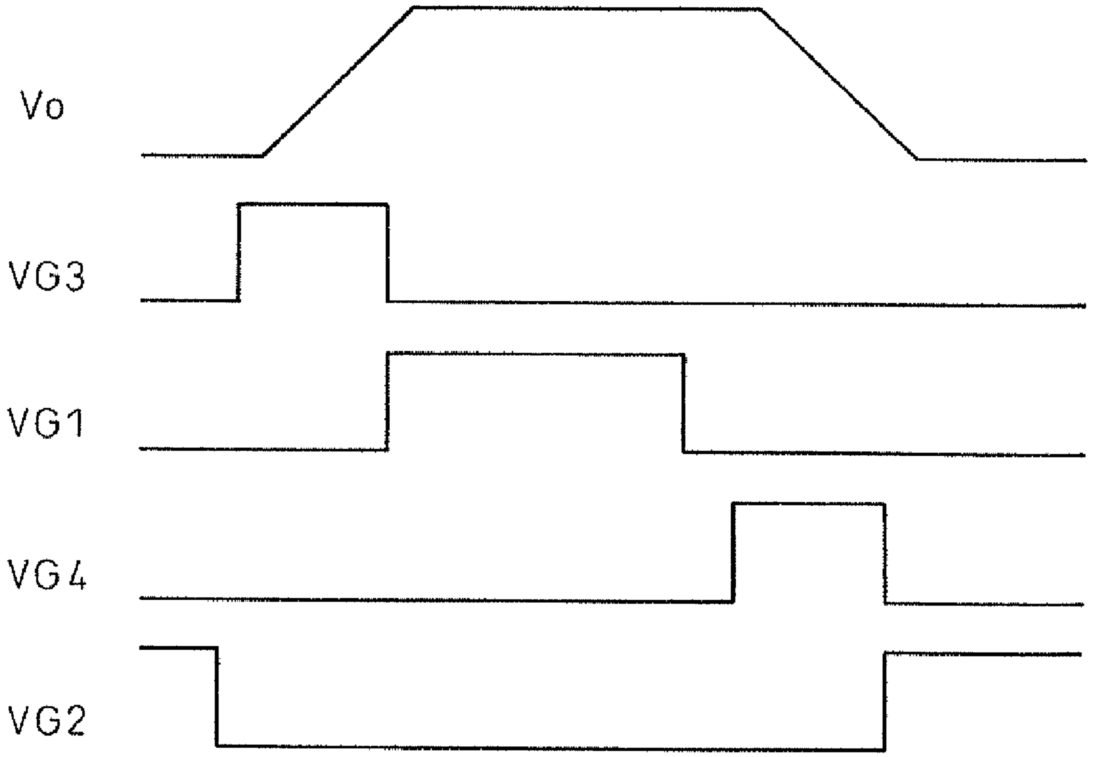
Prior Art FIG. 2
FIG. 2 is a diagram showing the operation in the sustain circuit shown in FIG. 1.
Figure 3A:
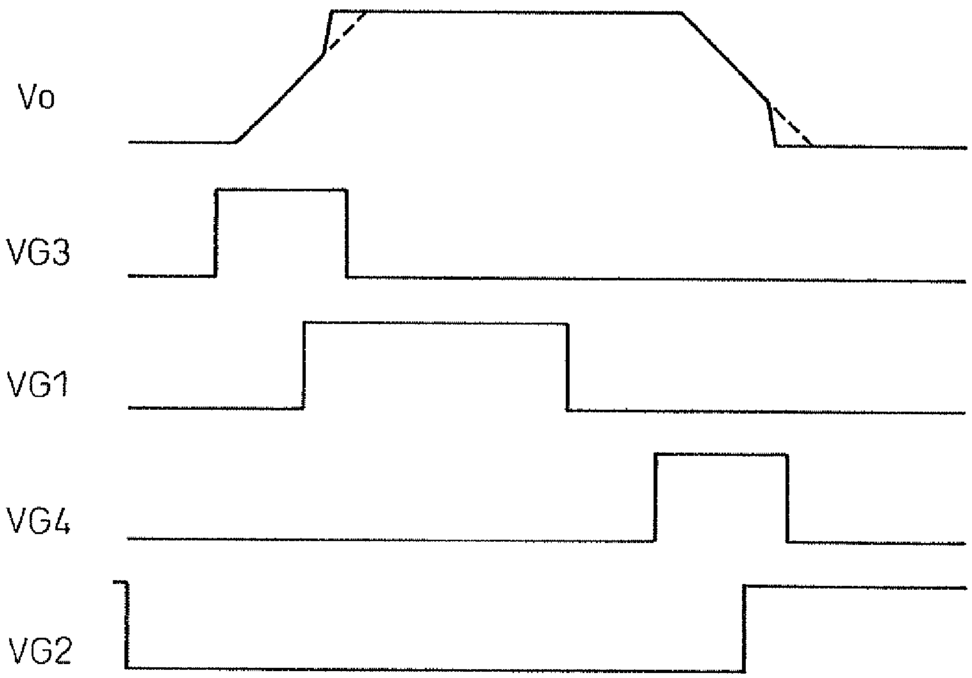
Prior Art FIG. 3A
FIG. 3A and FIG. 3B are diagrams for explaining the influence of the shift in timing in a power recovery circuit.
Figure 3B:
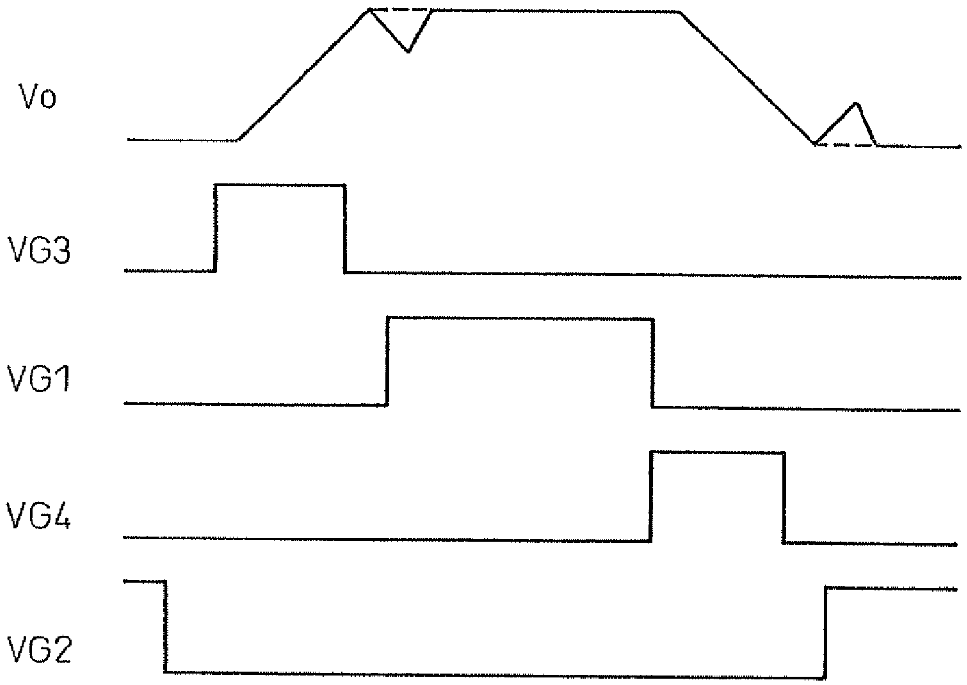
FIG. 3B Prior Art

As is obvious from comparison with FIG. 1, the sustain circuit in the first embodiment differs from the sustain circuit described in EP 1139323A in that the respective phase adjustment circuits 51 to 54 and the respective drive circuits 32, 34, 38, and 41 are constituted of respective single semiconductor integrated circuits (IC) 60A to 60D. Other parts are the same as those in the conventional case shown in FIG. 1 therefore no description is given here.

Figure 7:
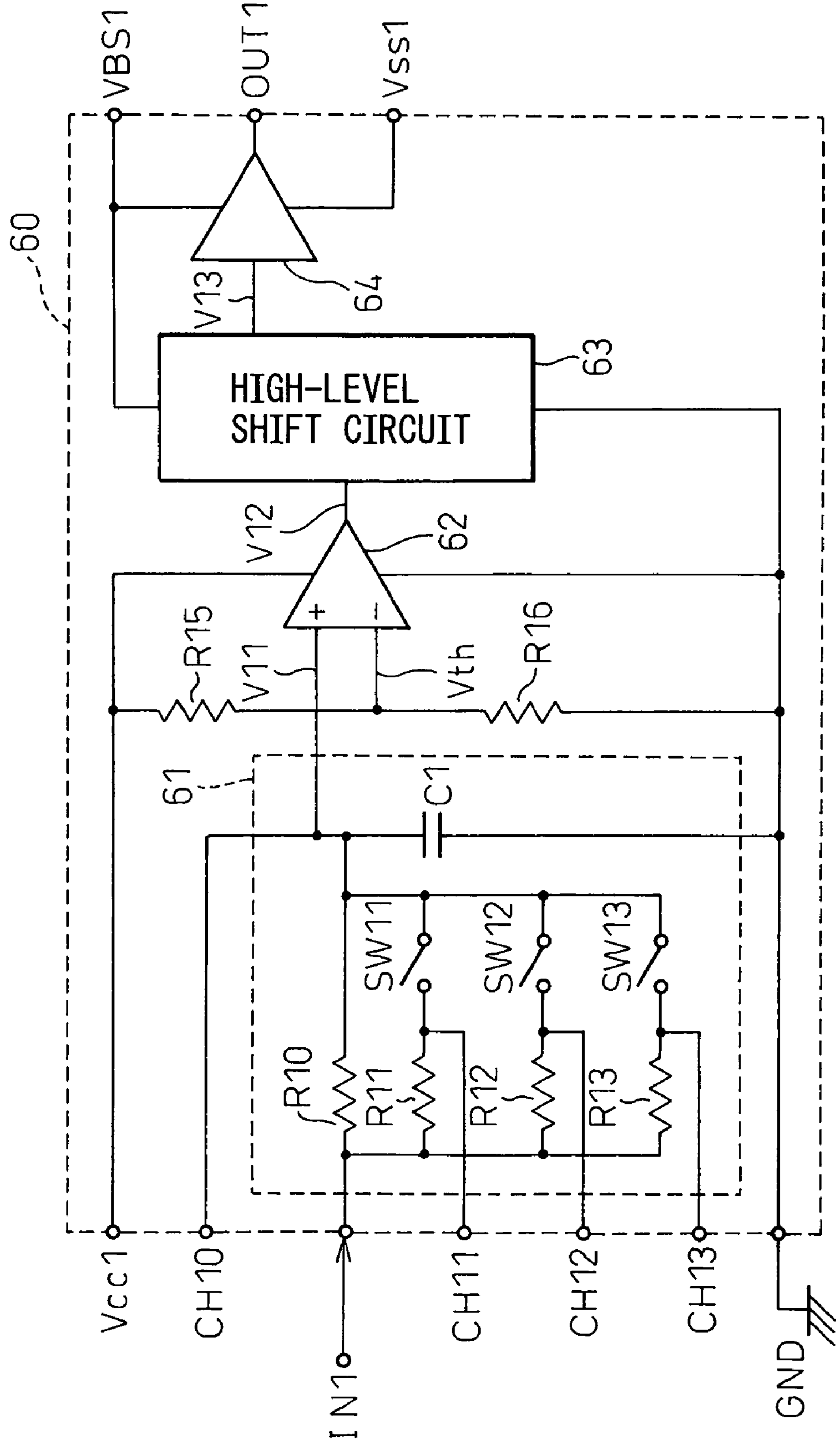
FIG. 7 is a diagram showing the configuration of a semiconductor integrated circuit (IC) used in the sustain circuit in the first embodiment.
Figure 8:
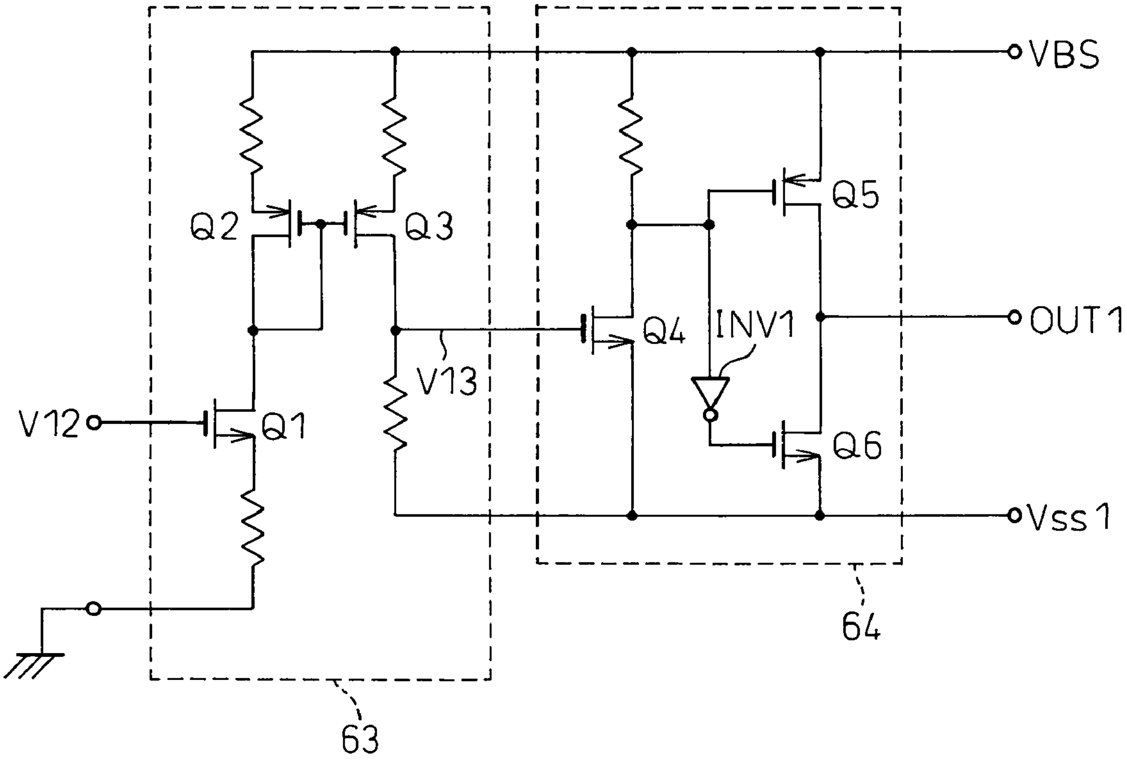
FIG. 8 is a diagram showing the configuration of a high-level shift circuit and an output amplifier circuit in the first embodiment.
Figure 9:
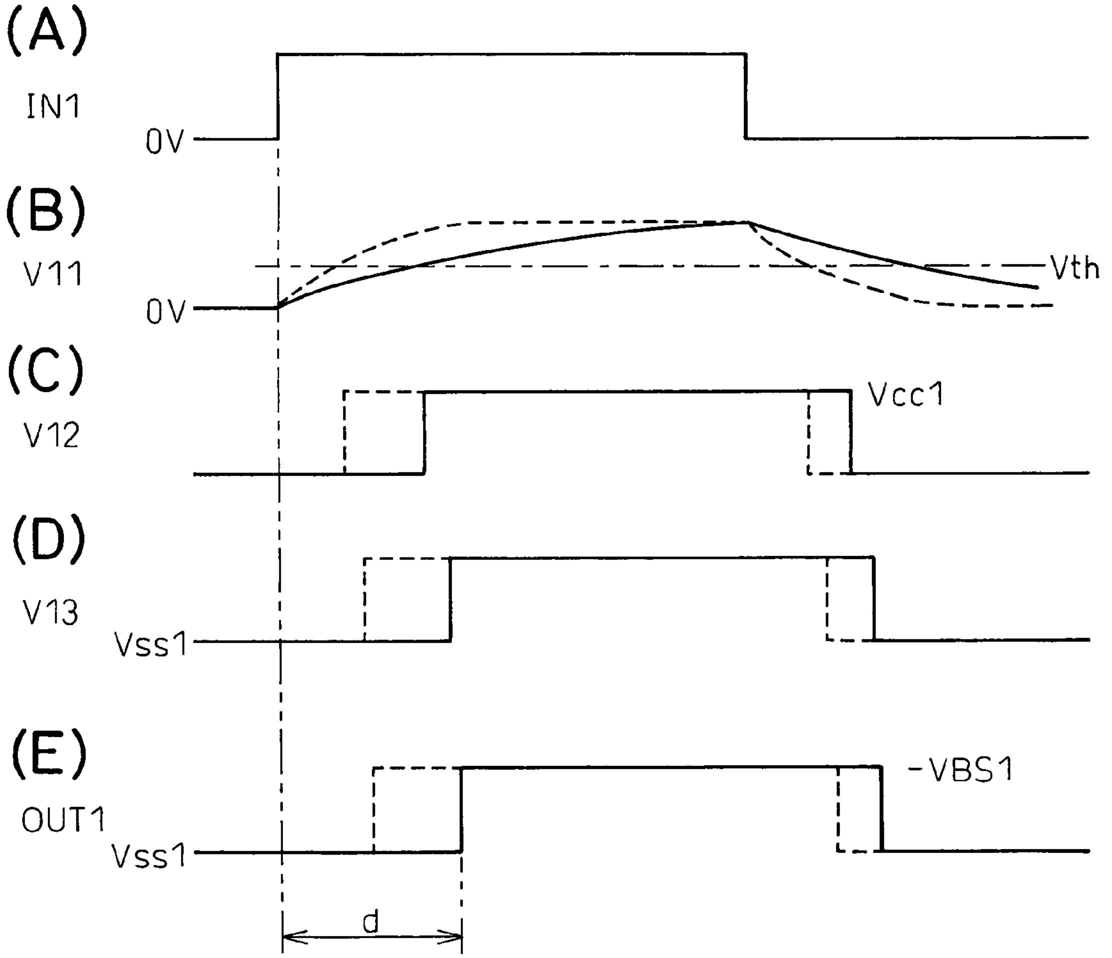
FIG. 9 is a diagram showing operation waveforms in the first embodiment.

FIG. 7 is a diagram showing the configuration of the ICs 60A to 60D. Reference numeral 60 denotes an IC corresponding to one of the ICs 60A to 60D. FIG. 8 shows the configuration of a high-level shift circuit provided in the IC 60 and FIG. 9 shows operation waveforms of the IC 60.

As shown in FIG. 7, the IC 60 comprises a delay time adjustment circuit 61, a comparison circuit 62, a high-level shift circuit 63, and an output amplifier circuit 64. The delay time adjustment circuit 61 is constituted of resistors R10, R11, R12, and R13, switches SW11, SW12, and SW13, and a capacitor C1, all the components being formed in the IC 60. The state of the switches SW11, SW12, and SW13 is controlled by an external signal applied through terminals CH10 to CH13 of the IC 60. As shown in FIG. 8, the high-level shift circuit 63 is constituted of transistors Q1 to Q3 and resistors and the output amplifier circuit 64 is constituted of transistors Q4 to Q6, an inverter INV1, and a resistor. The operation of the IC 60 is explained below.

In the circuit shown in FIG. 7, an input signal IN1 inputted from the input terminal to the IC 60 is a signal that changes stepwise as shown in FIG. 9(A) and is inputted to the comparison circuit 62 via the resistor R10. The resistor R10 and the capacitor C1 constitute an integral circuit and the input signal IN1 changes in the same manner as that of a voltage signal V11 shown in FIG. 9(B) and is inputted to the comparison circuit 62. The time constant of the integral circuit is determined by the resistance of the resistor R10 and the capacitance of the capacitor C1. The comparison circuit 62 compares the voltage signal V11 with a reference voltage Vth and outputs a voltage signal V12, which is the result of comparison shown in FIG. 9(C). The reference voltage Vht is a voltage with respect to the ground potential GND (0 V) of a logic voltage Vcc1 divided by the ratio of the resistance of a resistor R15 to that of a resistor R16.

As shown in FIG. 7 and FIG. 8, the high-level shift circuit 63 shifts the voltage signal V12, on the basis of the GND (0 V), and the logic voltage Vcc1 into a signal on the basis of an output reference voltage Vss1, and converts the signal into a voltage signal V13 shown in FIG. 9(D). The output amplifier circuit 64 amplifies the voltage signal V13 and generates an output signal OUT1 on the basis of the output reference voltage Vss1 and an output voltage VBS.

In the delay time adjustment circuit 61, when the switch 11 is turned on (brought into a state of being connected) by an external signal, the resistor R11 is brought into a state of being connected to the resistor R10 in parallel in the integral circuit and the time constant of the integral circuit is determined by the sum of the resistance of the resistor R10 and that of the resistor R11 and the capacitance of the capacitor C1. As a result, the time constant becomes smaller and the change of the voltage 11 shown in FIG. 9(B) becomes sharper. Due to this, it is possible to put forward the timing of the rising and falling edges of the output voltage signal V12 of the comparison circuit 62 and the timing of the rising and falling edges of the output signal OUT1, that is, to reduce a delay time d in the IC 60.

Similarly, by turning on the switch SW12, the resistor R12 can be connected in parallel to the resistor R10 and by turning on the SW13, the resistor R13 can be connected in parallel to the resistor R10. Thereby, it is possible to further change the timing of the rising and falling edges of the output signal OUT1 by further changing (reducing) the time constant of the integral circuit.

As described above, in the semiconductor integrated circuit 60 in the present embodiment, it is possible to adjust the timing of the rising and falling edges of the output signal OUT1 by setting the on/off state of the switches SW11 to SW13. Therefore, in each IC, for example, when there are variations in the delay time in the comparison circuit 62, the high-level shift circuit 63, and the output amplifier circuit 64 in the post stage, the on/off state of SW11 to SW13 is set so that the delay time in each IC is constant. Then, the IC set as described above is used in the configuration shown in FIG. 6 as the ICs 60A to 60D.

As described above, it is easy to highly precisely generate the signals V1 to V4 in an optimum phase relation. Therefore, if the delay time in each IC is constant as described above, the output semiconductor devices 31, 33, 37, and 40 can be driven in an optimum phase relation.

Moreover, in the present embodiment, the delay time adjustment circuit 61, and the comparison circuit 62, the high-level shift circuit 63, and the output amplifier circuit 64 constituting the drive circuit are formed in a single chip of a semiconductor integrated circuit (IC). As a result, it is possible to form in the same process the resistors and capacitors constituting the delay time adjustment circuit 61 and the devices constituting the comparison circuit 62, the high-level shift circuit 63, and the output amplifier circuit 64 to be provided in the post stage. Therefore, it becomes possible to design an input/output delay time while taking into consideration the characteristics of the resistors and capacitors and the characteristics of the devices constituting the comparison circuit 62, the high-level shift circuit 63, and the output amplifier circuit 64. As these circuits are formed on the same semiconductor chip, it is also possible to make the temperature characteristics of the devices constituting each circuit substantially the same. Due to this, the change in the input/output delay time can be kept to a minimum when the ambient temperature changes. Therefore, it is possible to keep the change in the input/output delay time caused by ambient temperature small compared to the conventional method in which the delay time adjustment circuit is constituted of discrete parts.

Figure 10:
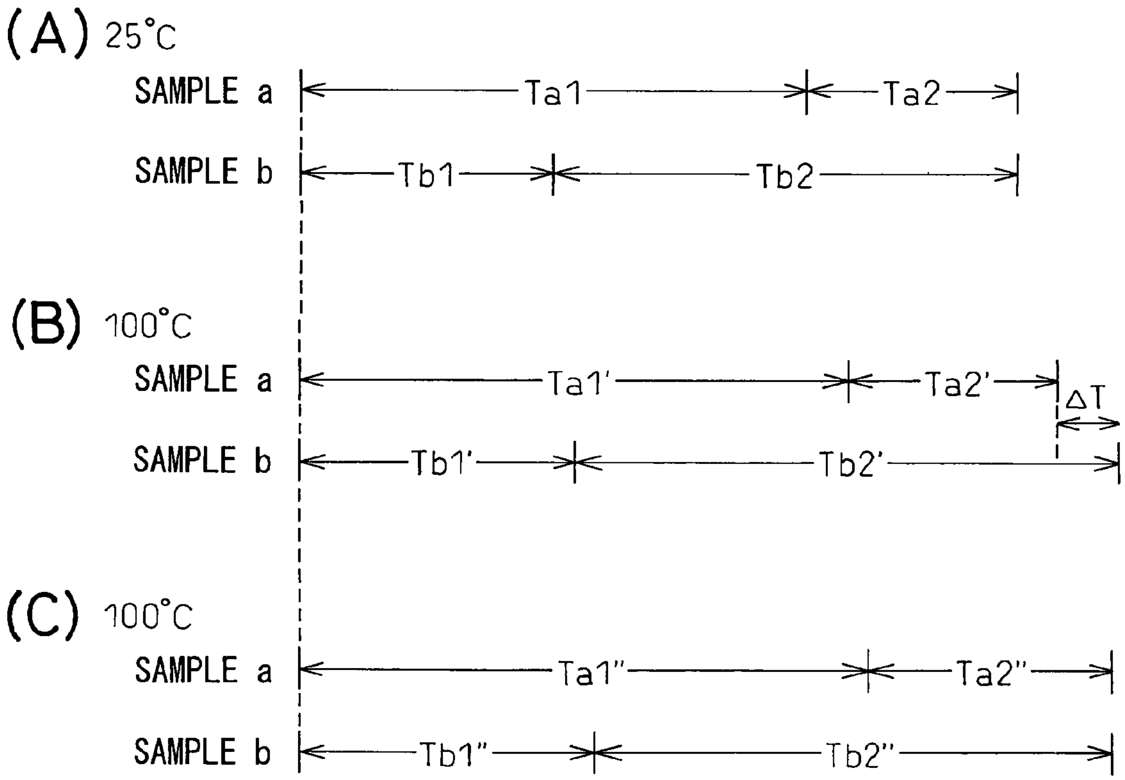
FIG. 10 is a diagram for explaining the effect of the present invention.

FIG. 10 is a diagram for explaining the effect of the present invention. FIG. 10(A) shows a state in which circuit samples a and b constituted of a delay time adjustment circuit, a comparison circuit, a high-level shift circuit, and an output amplifier circuit are adjusted so as to have a predetermined input/output delay time at an ambient temperature of Ta=25° C. Ta1 denotes a delay time in the delay time adjustment circuit in the sample a, Ta2 denotes a delay time in parts other than the delay time adjustment circuit in the sample a, Tb1 denotes a delay time in the delay time adjustment circuit in the sample b, Tb2 denotes a delay time in parts other than the delay time adjustment circuit in the sample b. In the samples a and b, the delay times Ta2 and Tb2 in the parts other than the delay time adjustment circuit are different, therefore, the delay times in the delay time adjustment circuit are adjusted to Ta1 and Tb1 so that Ta1+Ta2=Tb1+Tb2.

Here, the conventional case shown in FIG. 1, where the delay time adjustment circuit is constituted of discrete parts and the parts other than the delay time adjustment circuit are constituted of ICs, is discussed with reference to FIG. 10(B). In this case, the temperature characteristic differs between the delay time adjustment circuit and other parts and, for example, it is assumed that the temperature characteristic of the delay time in the delay time adjustment circuit differs from the temperature characteristic of the delay time in the parts other than the delay time adjustment circuit, that is, the delay time in the parts other than the delay time adjustment circuit changes more than the delay time in the delay time adjustment circuit does. When the ambient temperature changes to, for example, 100° C., the delay times Ta1, Ta2, Tb1, and Tb2 increase to Ta1', Ta2', Tb1', and Tb2', respectively, but as Ta1 of the sample a is greater than Tb1 of the sample b, the total amount of increased delay times of the sample a is smaller than the total amount of increased delay times of the sample b, resulting in a difference ΔT. As described above, in the conventional case, even if an adjustment is made so that an input/output delay time is the same at a certain temperature, a difference is made in the input/output delay time when the ambient temperature changes.

In contrast to this, in the present embodiment, as the delay time adjustment circuit is formed together with the other parts of the circuit in an IC, the temperature characteristic of the delay time in the delay time adjustment circuit coincides with the temperature characteristic of the other parts of the circuit. Therefore, when the ambient temperature changes to 100° C., Ta1, Ta2, Tb1, and Tb2 in FIG. 10(A) increase to Ta1", Ta2", Tb1", and Tb2", respectively, but the rate of change is the same, therefore, it is possible to make the total delay time Tal"+Ta2' coincide with the total delay time Tb1"+Tb2".

As described above, by forming the delay time adjustment circuit and the other circuits (the comparison circuit, high-level shift circuit, and output amplifier circuit) together in the same semiconductor integrated circuit, it is possible to reduce the variations in the input/output delay time of the semiconductor integrated circuit when temperature changes.

If the temperature characteristic of the delay time adjustment circuit is made to coincide with that of the other circuits, even if the delay time adjustment circuit and the other circuits are formed of discrete parts, the above-mentioned effect can be obtained.

Figure 11:
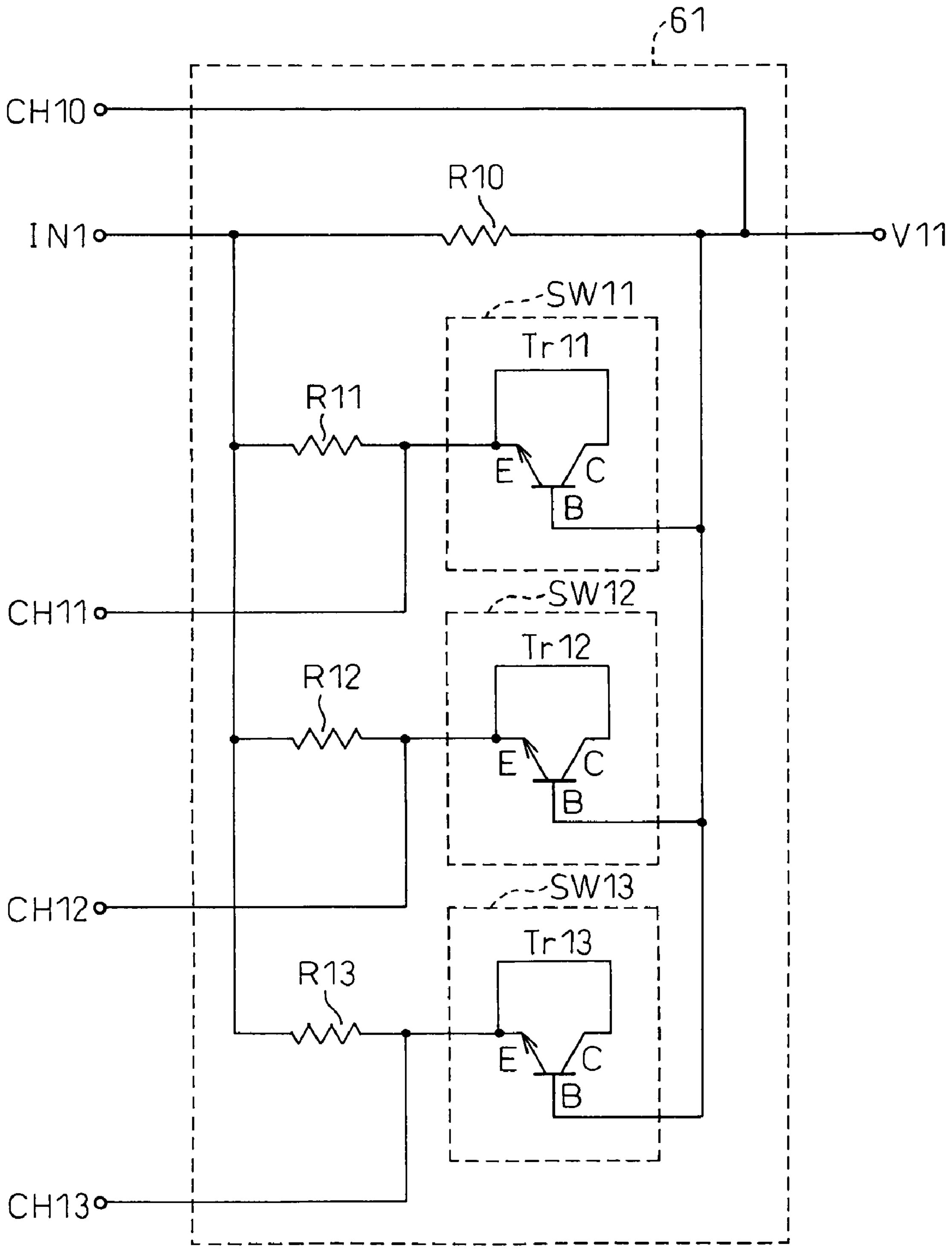
FIG. 11 is a diagram showing a specific configuration example of a delay time adjustment circuit in the first embodiment.

Next, a specific configuration example of the delay time adjustment circuit in the first embodiment is explained below. FIG. 11 shows a first configuration example of the delay time adjustment circuit. However, the capacitor C1 is not shown. This applies to FIG. 12 and FIG. 13 described below. As shown in FIG. 11, in this configuration example, the switches SW11, SW12, and SW13 are constituted of transistors Tr11, Tr12, and Tr13. In FIG. 11, E denotes the emitter terminal of the transistors Tr11 to Tr13, C denotes the collector terminal, and B denotes the base terminal. In order to turn SW11 on, a voltage greater than the emitter-base withstand voltage of Tr11 is applied between the terminal CH10 and the terminal CH11 to short-circuit the connection between the emitter and the base. Similarly, in order to turn SW12 on, a voltage greater than the emitter-base withstand voltage of Tr12 is applied between the terminal CH10 and the terminal CH12 to short-circuit the connection between the emitter and the base, and in order to turn SW13 on, a voltage greater than the emitter-base withstand voltage of Tr13 is applied between the terminal CH10 and the terminal CH13 to short-circuit the connection between the emitter and the base. If such a voltage is not applied, each switch is kept in the off state.

By applying the delay time adjustment circuit 61 shown in FIG. 11 to the semiconductor integrated circuit shown in FIG. 7, it is possible to set the on/off states of SW11 to SW13 so that the difference between the rising edge of the input signal and the rising edge of the output signal is a predetermined value. In the delay time adjustment circuit shown in FIG. 11, a voltage greater than the emitter-base withstand voltage of Tr11 to Tr13 is applied to short-circuit the connection between the emitter and the base, therefore, it is not possible to return the state to the original off (cutoff) state again. Because of this, it is preferable to determine in advance which switch to turn on by establishing a short circuit between the terminals CH10 and CH11, between the terminals CH10 and CH12, and between the terminals CH10 and CH13, respectively, at the outside before short-circuiting the connection between the emitter and the base by applying a voltage greater than the emitter-base withstand voltage of Tr11 to Tr13.

Figure 12:
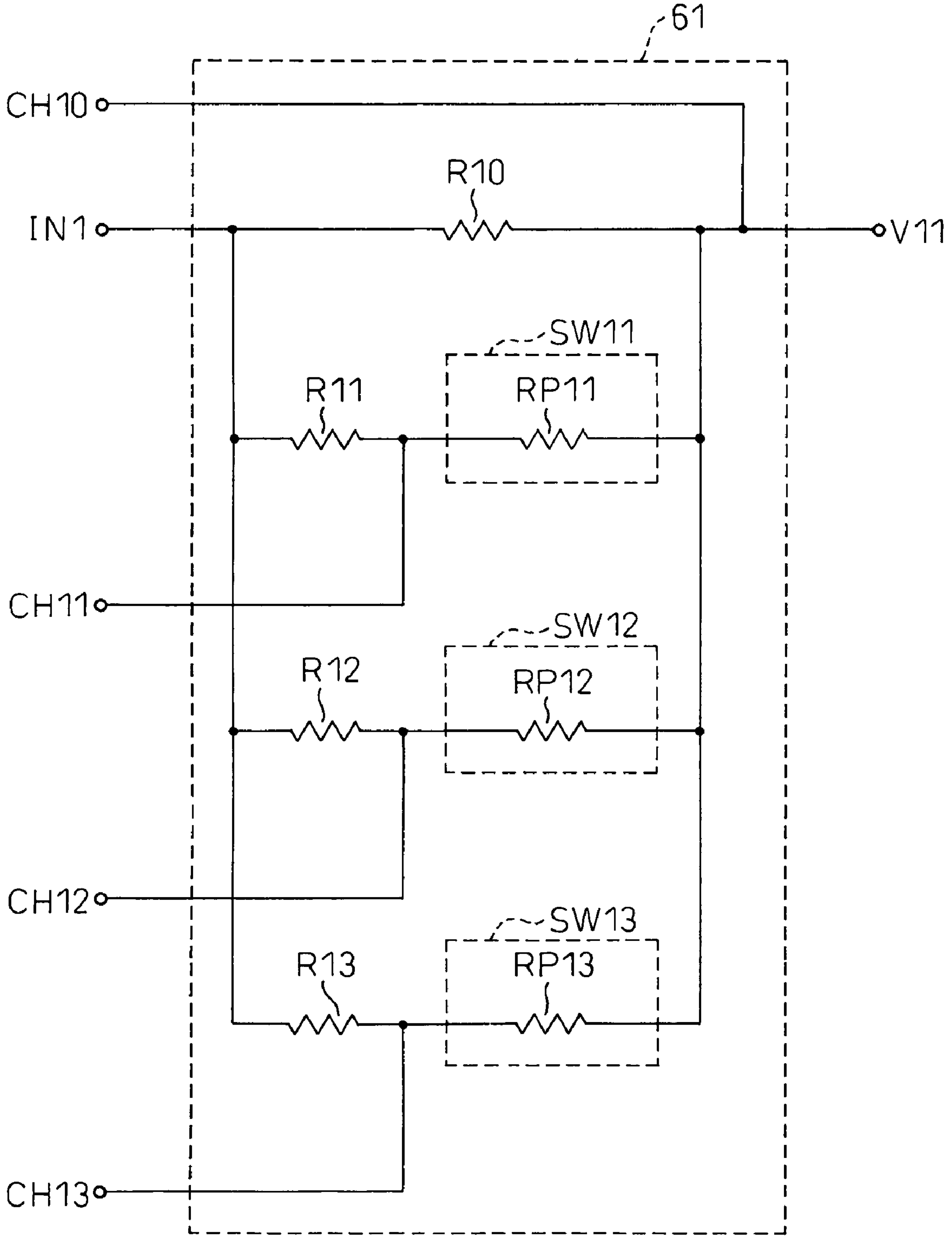
FIG. 12 is a diagram showing a specific configuration example of the delay time adjustment circuit in the first embodiment.

The delay time adjustment circuit 61 can be realized by a configuration other than that shown in FIG. 11. FIG. 12 shows a second configuration example of the delay time adjustment circuit. As shown in FIG. 12, in this configuration example, the switches SW11, SW12, and SW13 are constituted of resistors RP11, RP12, and RP13. In the circuit shown in FIG. 12, normally a series circuit constituted of the resistors R11 and RP11, a series circuit constituted of the resistors R12 and RP12, and a series circuit constituted of the resistors R13 and RP13 are connected in parallel to the resistor R10, respectively. Therefore, the time constant of the integral circuit is determined based on the resistance of the combined resistor constituted of these resistors and the capacitance of the capacitor C1.

In such a state, it is possible to bring SW11 into the off (open) state by making an overcurrent flow through the resistor RP11 used as SW11 to burn out. As a result, the resistance of the combined resistor becomes large and the gradient of the change in the voltage V11 can be made more gradual. Similarly, it is possible to bring SW12 into the off state by making an overcurrent flow through the resistor RP12 used as SW12 to burn out and to bring SW13 into the off state by making an overcurrent flow through the resistor RP13 used as SW13 to burn out.

In the circuit shown in FIG. 12 also, by applying the IC shown in FIG. 7, it is possible to set the on/off state of SW11 to SW13 according to whether an overcurrent is made to flow through RP11 to RP13 and to set the input/output delay time constant.

Instead of burning out the resistors RP11, RP12, and RP13 with an overcurrent, a laser can be used to cut the resistor to bring SW11 to SW13 into the off (open) state.

Figure 13:
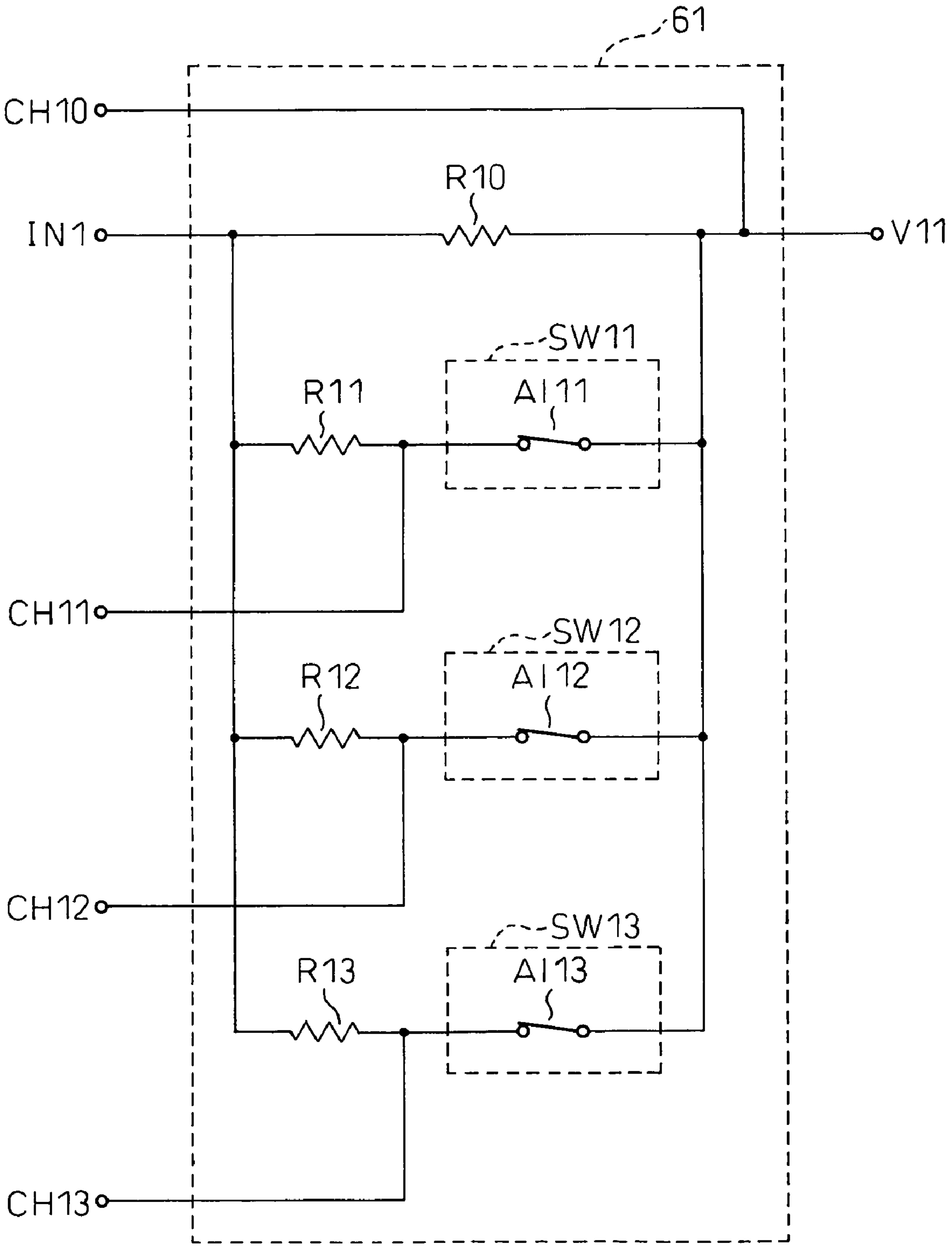
FIG. 13 is a diagram showing a specific configuration example of the delay time adjustment circuit in the first embodiment.

FIG. 13 shows a third configuration example of the delay time adjustment circuit. As shown in FIG. 13, in this configuration example, the switches SW11, SW12, and SW13 are constituted of aluminum wires Al11, Al12, and Al13. In the circuit shown in FIG. 13, normally, a series circuit constituted of the resistors R11 and Al11, a series circuit constituted of the resistors R12 and Al12, and a series circuit constituted of the resistors R13 and Al13 are connected in parallel to the resistor R10, respectively. Therefore, the time constant of the integral circuit is determined based on the resistance of the combined resistor constituted of these resistors and aluminum wires and the capacitance of the capacitor C1.

In such a state, it is possible to bring SW11 into the off (open) state by making an overcurrent flow through the aluminum wire Al11, used as SW11, to burn it out. As a result, the resistance of the combined resistor becomes large and the gradient of the change in the voltage V11 can be made more gradual. Similarly, it is possible to bring SW12 into the off state by making an overcurrent flow through the aluminum wire Al12, used as SW12, to it burn out and to bring SW13 into the off state by making an overcurrent flow through the aluminum wire Al13 used as SW13 to burn out.

In the circuit shown in FIG. 13 also, by applying the IC shown in FIG. 7, it is possible to set the on/off state of SW11 to SW13 according to whether an overcurrent is made to flow through Al11 to Al13 and set the input/output delay time constant. Instead of burning out the aluminum wires Al11, Al12, and Al13 with an overcurrent, a laser can be used to cut the aluminum wires to bring SW11 to SW13 into the off (open) state in the circuit shown in FIG. 13.

Figure 14:
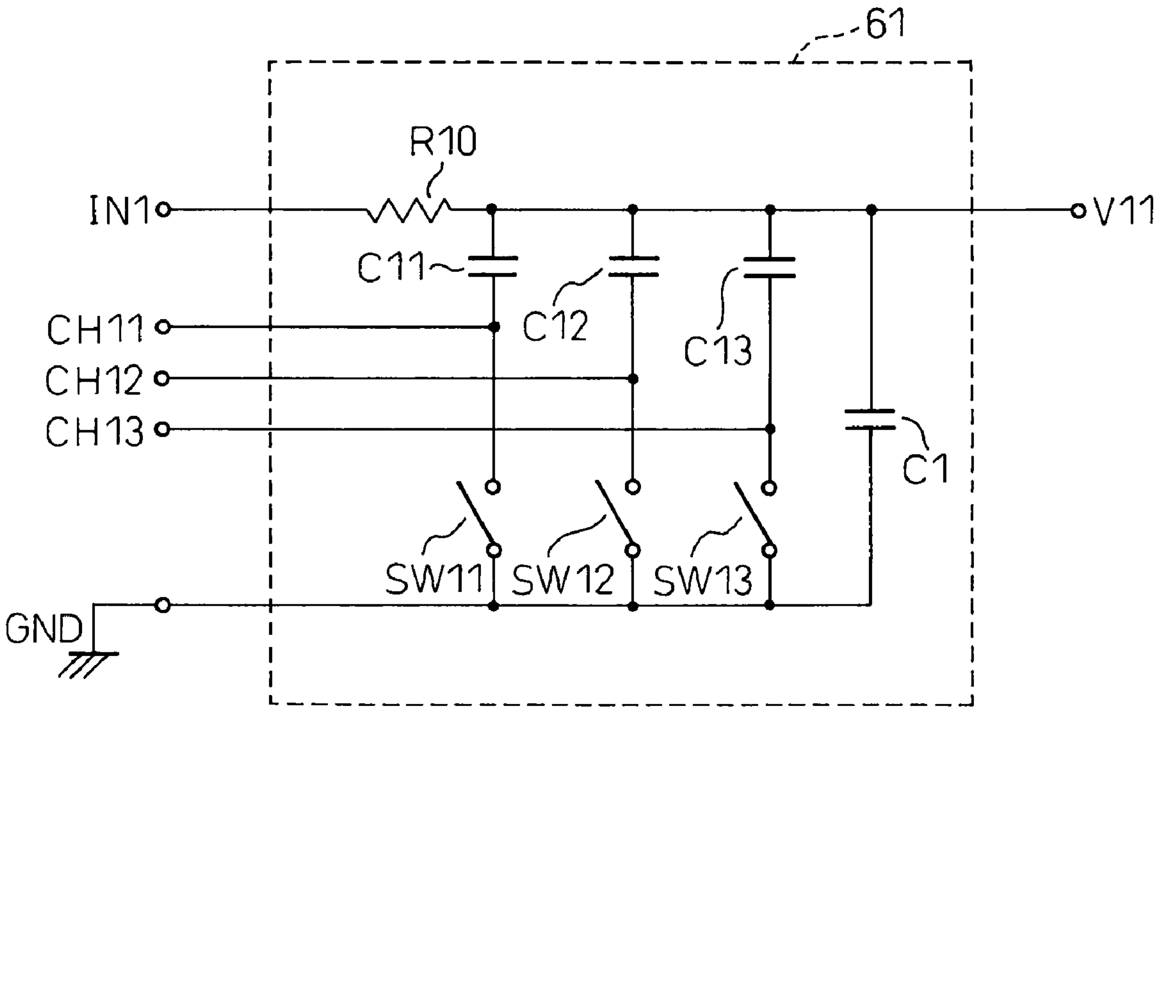
FIG. 14 is a diagram showing another specific configuration example of the delay time adjustment circuit in the first embodiment.

FIG. 14 shows another configuration example of the delay time adjustment circuit 61. In the delay time adjustment circuit 61 shown in FIG. 7, the resistance of the combined resistor is changed, however, in the delay time adjustment circuit shown in FIG. 14, the capacitance of combined capacitor is changed. In this configuration example, as shown in FIG. 14, the switches SW11, SW12, and SW13 are connected to capacitors C11, C12, and C13 in series, respectively. By turning the switches SW11, SW12, and SW13 on or off, whether the capacitor C1 and the capacitors C11 to C13 are connected in parallel can be set. The switches SW11, SW12, and SW13 can be realized by using the same switches as those shown in FIG. 11 to FIG. 13.

The circuit shown in FIG. 14 can also be applied to the IC shown in FIG. 7 and it is possible to set the input/output delay time in the IC 60 to a substantially constant value by appropriately setting the on or off state of SW11 to SW13 to change the time constant determined by the resistor R10 and the capacitors C1 and C11 to C13.

A modification of the delay time adjustment circuit is explained as above, however, there can be various modifications. For example, it is possible to set the input/output delay time substantially constant by laser-trimming the resistor R10 shown in FIG. 7 to change the resistance thereof and thus changing the time constant determined by the resistance of the resistor R10 and the capacitance of the capacitor C1. In this case, the resistors R11 to R13 and the switches SW11 to SW13 in FIG. 7 can be removed.

Moreover, it becomes possible to more precisely set the input/output delay time by increasing the number of series circuits constituted of a resistor and a switch to be connected to the resistor R10 in parallel as shown in FIG. 7 or the number of series circuits constituted of a capacitor and a switch to be connected to the capacitor C1 in parallel as shown in FIG. 14. On the other hand, it is possible to widen the adjustable range by making the resistance or the capacitance of each series circuit differ from another.

Figure 15:
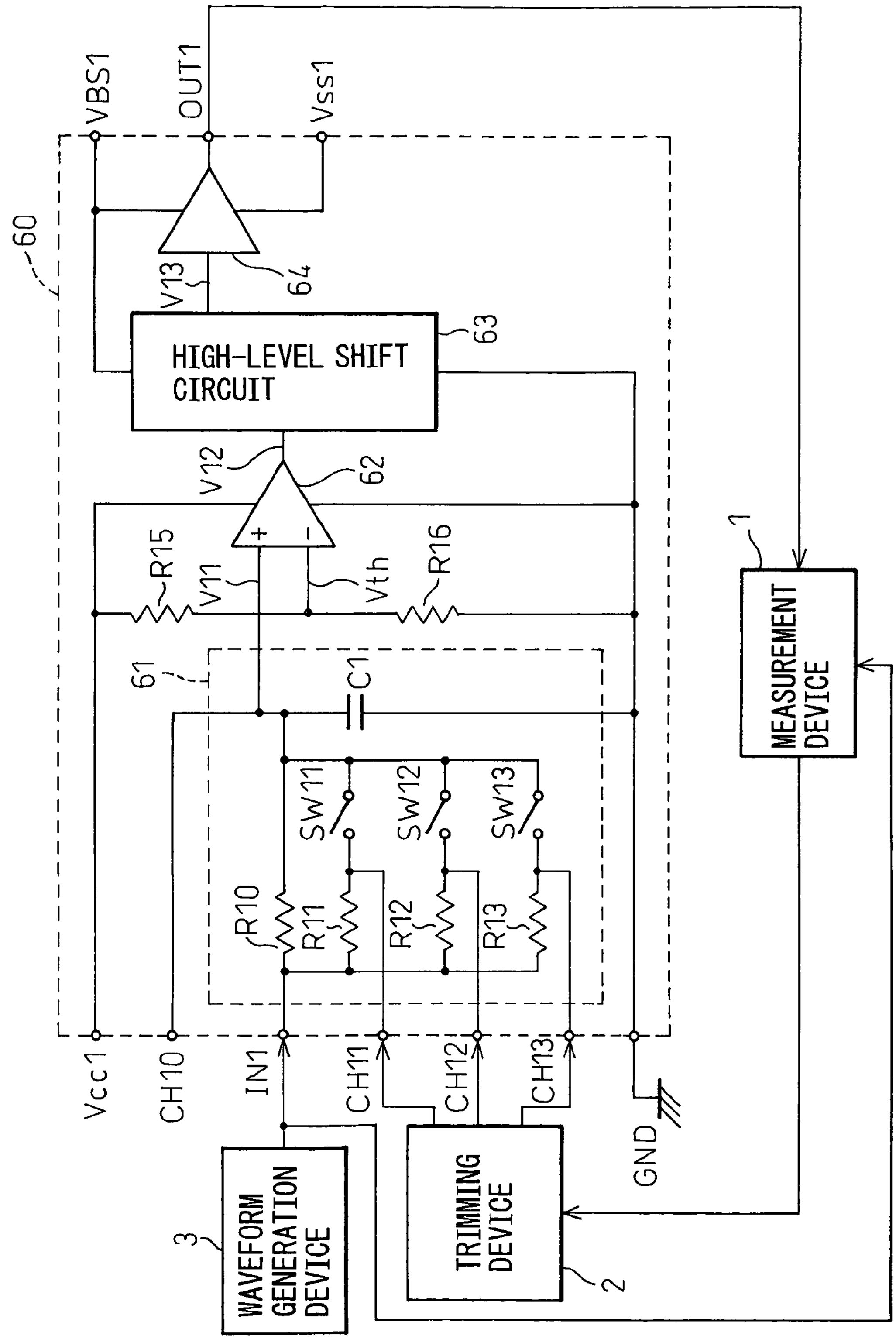
FIG. 15 is a diagram showing a method for setting a delay time of a semiconductor integrated circuit (IC) used in the first embodiment.

Next, a method for setting a delay time of a semiconductor integrated circuit having a delay time adjustment circuit is explained below. FIG. 15 is a diagram showing a method for setting a delay time of the delay time adjustment circuit in the semiconductor integrated circuit in the first embodiment. As shown schematically, a test signal generated by a waveform generation device 3 is inputted to a measuring device 1 as well as being inputted to the input terminal IN1 of the semiconductor integrated circuit (IC) 60. The measuring device 1 measures the difference in the rising edge or falling edge between two signals upon receipt of the output signal OUT1 generated by the IC 60 in accordance with the test signal and the test signal. Based on the difference, the measuring device 1 selects the on-off state of SW11 to SW13 so that the delay time in the IC 60 falls within a predetermined range and outputs the selection result to a trimming device 2. The trimming device 2 outputs a switch selection signal from the terminal CH11 to CH13 and sets the state of SW11 to SW13 based on the selection result of the on/off state of SW11 to SW13. In this manner, the setting of the delay time adjustment circuit is completed and the delay time of the integrated circuit 60 falls within the predetermined range.

Figure 16:
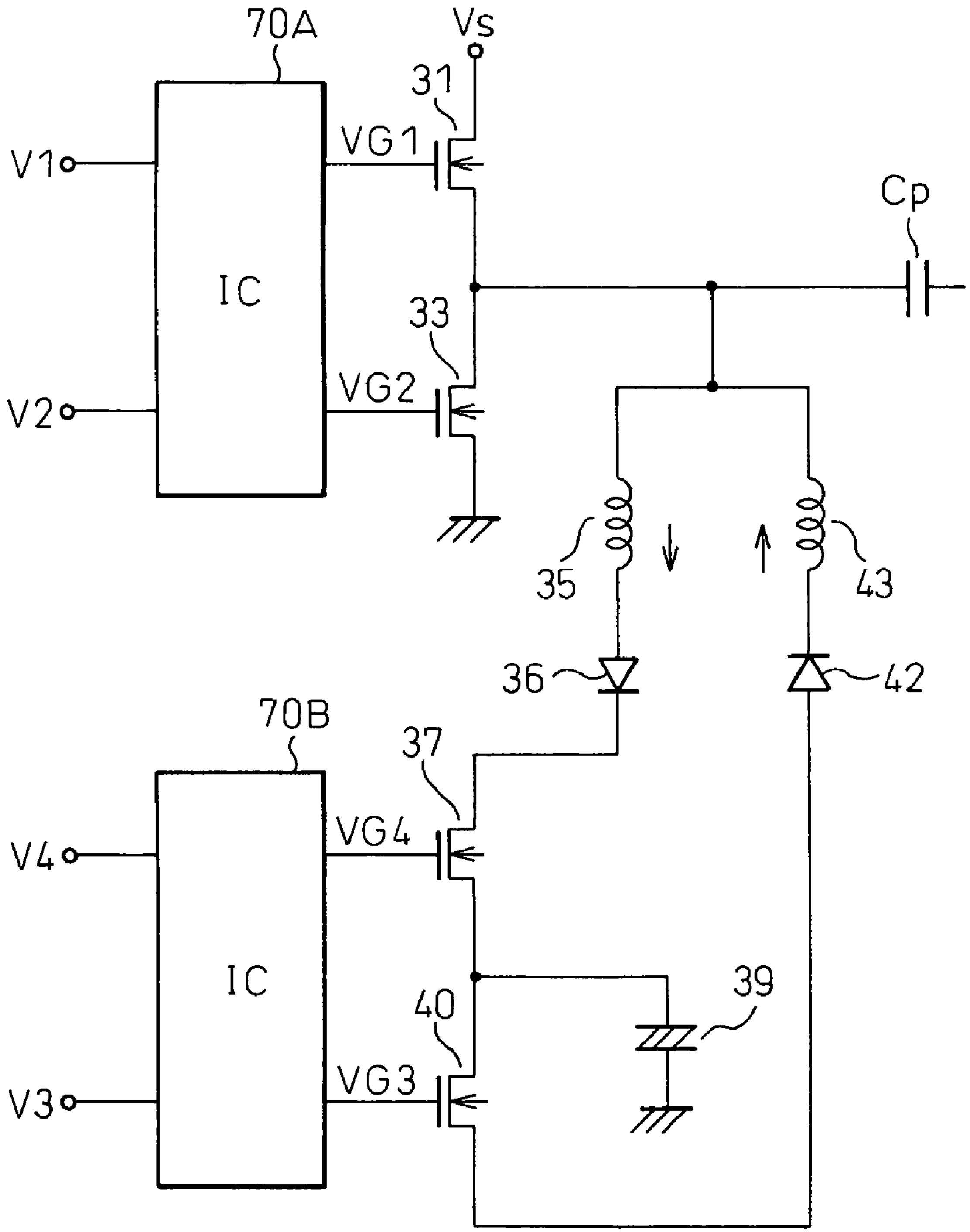
FIG. 16 is a diagram showing the configuration of a sustain circuit in a second embodiment of the present invention.

FIG. 16 is a diagram showing a sustain circuit of a PDP apparatus in a second embodiment of the present invention. FIG. 16 is a diagram corresponding to FIG. 6. Other parts of the PDP apparatus in the second embodiment are the same as those in the first embodiment. As is obvious from comparison with FIG. 6, the sustain circuit in the second embodiment differs from that in the first embodiment in that the high-side output semiconductor device 31 and the low-side output semiconductor device 33 are driven by using a semiconductor integrated circuit (IC) 70A having a 2-channel input/output terminal and the output semiconductor device 37 and the output semiconductor device 40 are driven by using an IC 70B.

Figure 17:
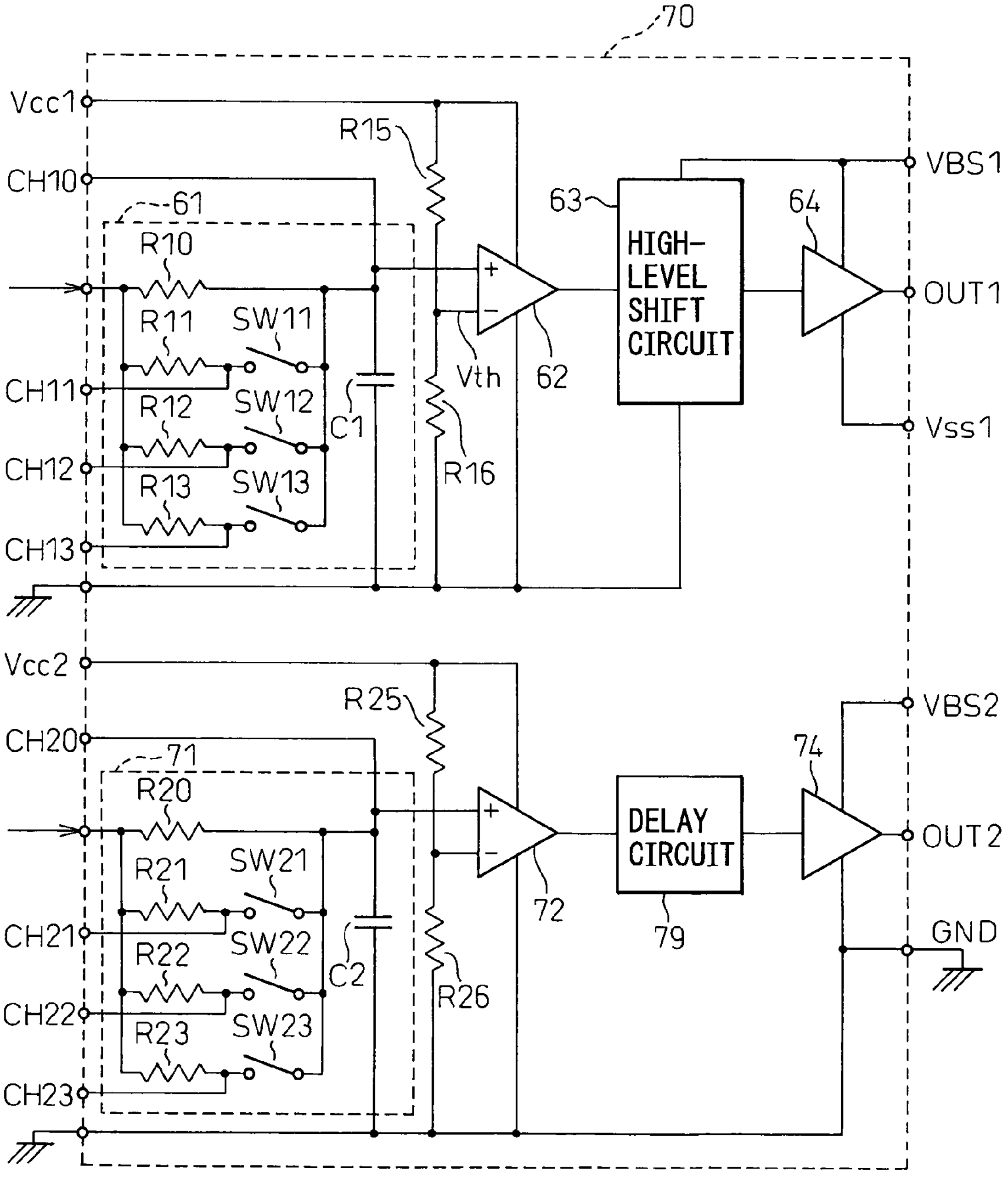
FIG. 17 is a diagram showing the configuration of a semiconductor integrated circuit (IC) used in the sustain circuit in the second embodiment.

FIG. 17 is a diagram showing the configuration of the IC 70 used in the sustain circuit in the second embodiment. As shown schematically, the IC 70 has the 2-channel input/output terminal, wherein one of the channels drives the high-side output semiconductor device and the other drives the low-side output semiconductor device. The circuit located at the upper part in the diagram is a drive circuit to drive the high side and has the same configuration as that in the first embodiment shown in FIG. 7. The circuit located at the lower part is a drive circuit to drive the low side and differs from the circuit to drive the high side in that a delay circuit 79 is used instead of the high-level shift circuit 63. The delay circuit 79 is provided in order to delay a signal by the same time as that of the propagation delay provided by the high-level shift circuit 63 and reduce the difference in delay time between the high-side output signal OUT1 and a low-side output signal OUT2.

In the circuit shown in FIG. 17, as the two channels on the high side and the low side are formed by a single chip IC, the difference in the input/output delay time between the input signal IN1 and the output signal OUT1 on the high side and the difference in the input/output delay time between an input signal IN2 and the output signal OUT2 on the low side can be further reduced. Due to this, it is possible to more accurately set the drive timing of a half bridge circuit driven by connecting the power MOSFETs on the high side and the low side in series. As a result, it becomes unlikely that the power MOSFET on the high side and the power MOSFET on the low side enter the on (conduction) state simultaneously to cause a penetrating current to flow and, therefore, both the power MOSFETs on the high side and the low side can be operated at a high speed. Moreover, as in the first embodiment, the delay time adjustment circuit and the circuits in the post stage are formed by a single chip IC and, therefore, the variations in device and the variations in the input/output delay time depending on the change in ambient temperature can be kept to a minimum.

In the circuit shown in FIG. 17, it is possible for a delay time adjustment circuit 71 to provide a delay time that is to be provided by the delay circuit 79 in the post stage by increasing the capacitance of a capacitor C2 in the delay time adjustment circuit 71 that delays IN2 or by increasing the resistance of resistors R20 to R23 and, therefore, the delay circuit 79 can be removed. At this time, it is possible to maintain the accuracy of adjustment by increasing the number of series circuits constituted of a resistor and a switch, which are connected to the resistor R20 in parallel.

Figure 18:
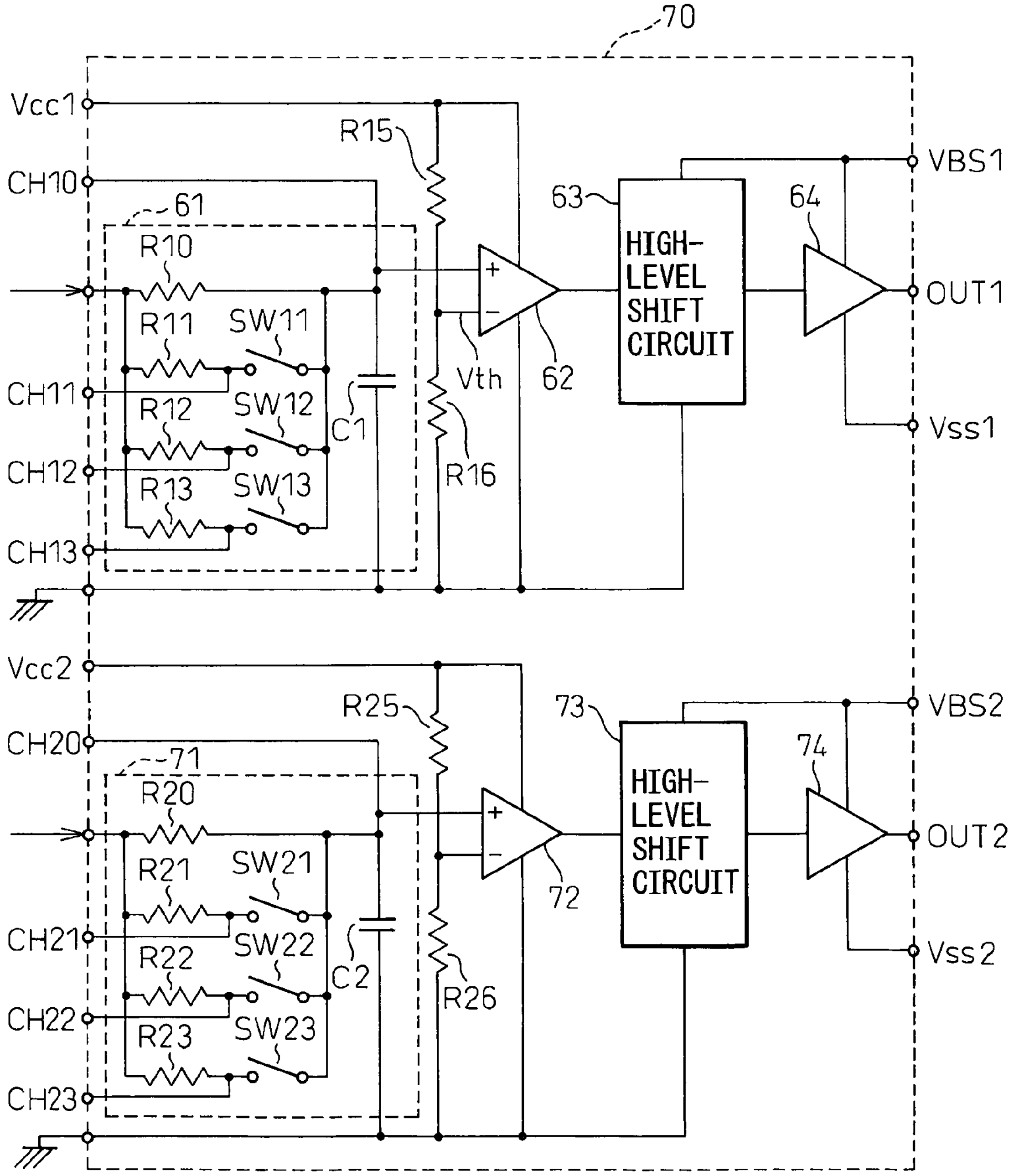
FIG. 18 is a diagram showing the configuration of a semiconductor integrated circuit (IC) used in a sustain circuit in a third embodiment.

FIG. 18 is a diagram showing the configuration of an IC 70 used in a sustain circuit in a PDP apparatus in a third embodiment of the present invention. The PDP apparatus in the third embodiment has the same configuration as that in the second embodiment except for the configuration of the IC 70 used in the sustain circuit. The IC 70 used in the third embodiment also has the 2-channel input/output terminal and is a drive circuit for driving the output semiconductor devices of high-side/low-side driven type. As shown schematically, the IC 70 in the third embodiment differs from that in the second embodiment in that both the high side and the low side are provided with the high-level shift circuit and the two channels have the same circuit configuration. Due to this, the difference in the input/output delay time between the input signal IN1 and the output signal OUT1 on the high side and the difference in the input/output delay time between the input signal IN2 and the output signal OUT on the low side can be further reduced compared to the circuit in the second embodiment. Moreover, in the IC circuit in the second embodiment, the output of OUT2 is a voltage on the basis of GND (0 V), however, the output of OUT2 can be a voltage on the basis of an output reference voltage Vss2 in the IC circuit in the third embodiment. The output reference voltage Vss2 can be set arbitrarily as long as it is higher than GND and, therefore, the use range of the IC can be widened.

Figure 19:
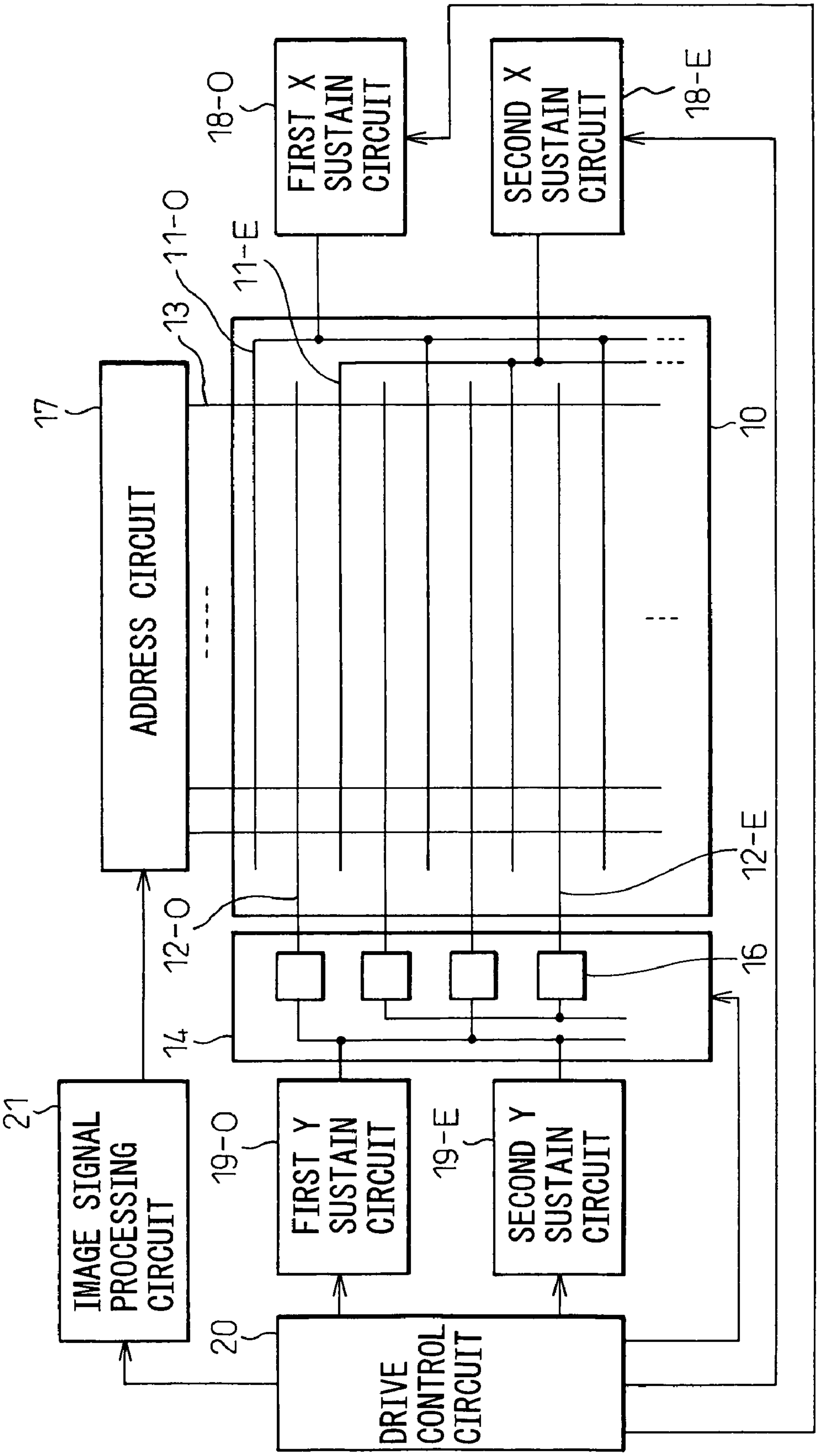
FIG. 19 is a block diagram showing the general configuration of a PDP apparatus in a fourth embodiment of the present invention.

FIG. 19 is a block diagram showing the general configuration of a PDP apparatus in a fourth embodiment of the present invention. The PDP apparatus is required to be highly precise and U.S. Pat. No. 6,373, 452 discloses a system in which light is emitted between display electrodes to produce a display. This system is referred to as the ALIS system and the same term is used here. The detailed configuration of the ALIS system is disclosed in U.S. Pat. No. 6,373,452, therefore, only the points relating to the present invention are briefly explained below.

As shown in FIG. 19, in a PDP employing the ALIS system, n Y electrodes (second electrodes) 12-O and 12-E and n+1 X electrodes (first electrodes) 11-O and 11-E are arranged adjacently by turns and light emission to produce a display is carried out between every pair of neighboring display electrodes (Y electrode and X electrode). Therefore, 2n display lines are formed with 2n+1 display electrodes. In other words, in the ALIS system, it is possible to realize an accuracy level double that of the configuration shown in FIG. 4 with the same number of display electrodes. Moreover, a discharge space can be used without waste and the amount of light shut off by electrodes is small, therefore, a high numerical aperture can be obtained and a high luminance can be realized. In the ALIS system, every gap between every pair of neighboring display electrodes is used for discharge to produce a display but all the discharges cannot be caused to occur simultaneously. Therefore, the so-called interlaced scan is carried out, in which a display is produced by dividing the display lines into odd lines and even lines with respect to time. In the odd field, a display is produced using odd-numbered display lines and in the even field, a display is produced using even-numbered display lines, and a total display is obtained by combining the display in the odd field and the display in the even field.

The Y electrodes are connected to the scan driver 14. The scan driver 14 is provided with the switches 16 that are switched so that a scan pulse is applied sequentially during the address period and are also switched so that the odd Y electrode 12-O is connected to a first Y sustain circuit 19-O and the even Y electrode 12-E is connected to a second Y sustain circuit 19-E. The odd X electrode 11-O is connected to a first X sustain circuit 18-O and an even X electrode 11-E is connected to a second X sustain circuit 18-E. The address electrode 13 is connected to the address driver 17. The image signal processing circuit 21 and the drive control circuit 20 perform the same operation as that explained in the first embodiment.

Figure 20A:
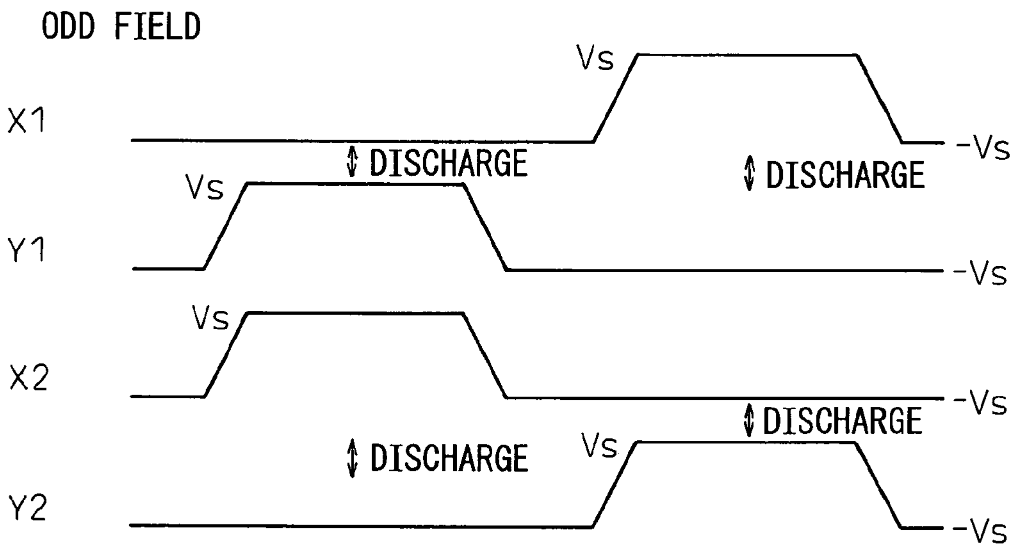
FIG. 20A and FIG. 20B are diagrams showing drive waveforms in a sustain discharge period in the PDP apparatus in the fourth embodiment.
Figure 20B:
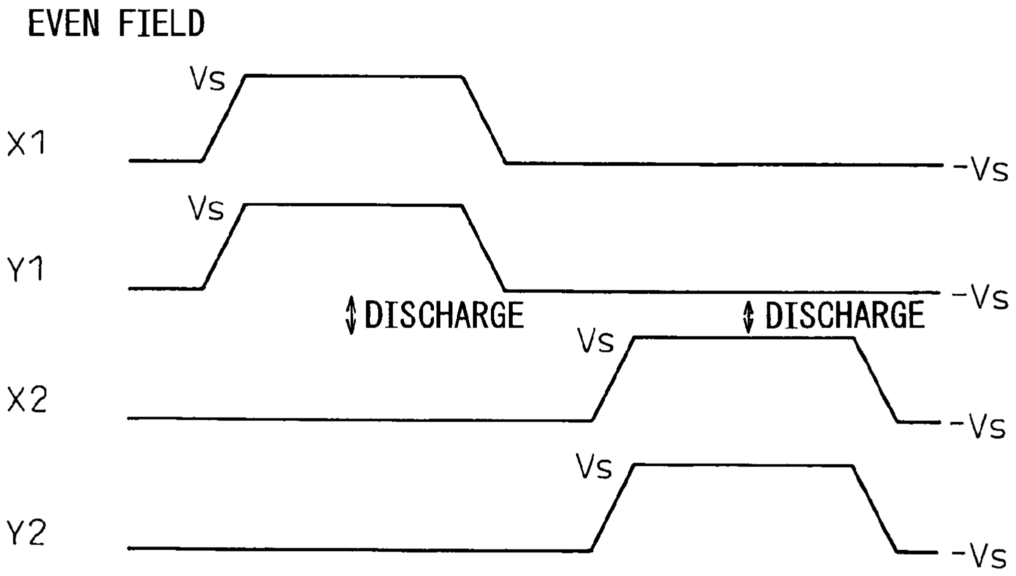

FIG. 20A and FIG. 20B are diagrams showing drive waveforms during the sustain discharge period in the ALIS system, where FIG. 20A shows waveforms in the odd field and FIG. 20B shows waveforms in the even field. In the odd field, a voltage Vs is applied to the electrodes Y1 and X2 to set X1 and Y2 to the ground level and a discharge is caused to occur between X1 and Y1 and between X2 and Y2, that is, in odd display lines. At this time, the potential difference is zero between Y1 and X2 of the even display line and no discharge is caused to occur. Similarly, in the even field, the voltage Vs is applied to the electrodes X1 and Y2 to set Y1 and X2 to the ground level and a discharge is caused to occur between Y1 and X2 and between Y2 and Y1, that is, in the even display lines. No description of drive waveforms during the reset period and the address period will be given here.

In the ALIS system, no discharge is caused to occur between neighboring electrodes to which the same voltage is applied, however, if the timing of application is shifted, a discharge is caused to occur temporarily in a display line that does not contribute to a display and wall charges written during the address period are reduced and, as a result, a problem may arise in that a normal display is not produced. For example, in FIG. 20A, when a sustain pulse is applied to the electrode Y1 and, after a while, a sustain pulse is applied to the electrode X2, a state is established temporarily in which the electrode Y1 is at the H level and the X2 is at the L level, therefore, there is the possibility that an erroneous discharge may be caused to occur between the electrodes Y1 and X2. Such an erroneous discharge ceases when a sustain pulse is applied to the electrode X2 but the erroneous discharge reduces the wall charges on the electrodes Y1 and X2 and there is the possibility that a normal display may not be produced.

Figure 21:
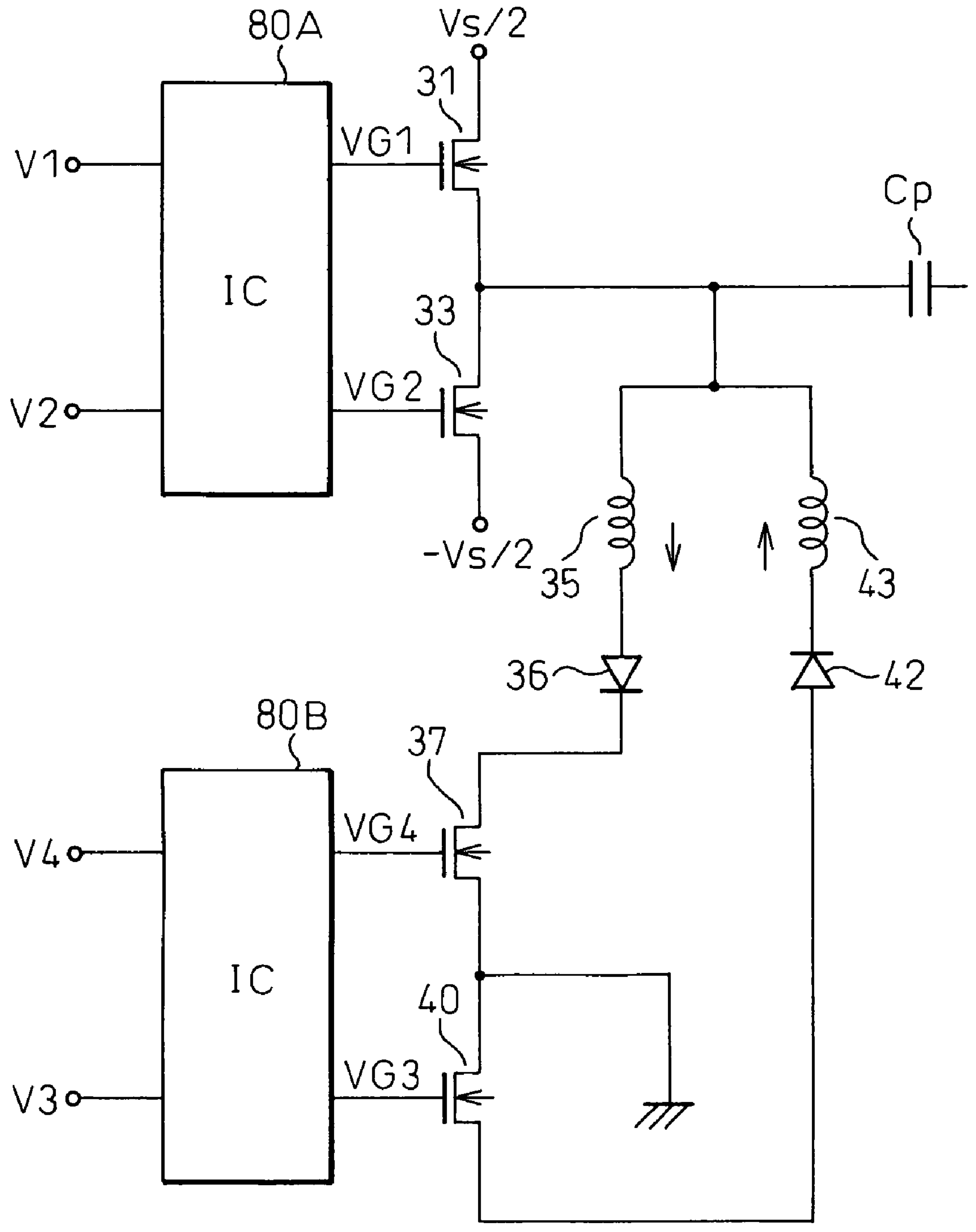
FIG. 21 is a diagram showing the configuration of a sustain circuit in the fourth embodiment.

FIG. 21 is a diagram showing the sustain circuit in the PDP apparatus in the fourth embodiment, corresponding to FIG. 6 and FIG. 16. The first X sustain circuit 18-O, the second X sustain circuit 18-E, the first Y sustain circuit 19-O, and the second Y-sustain circuit 19-E are configured by the sustain circuit shown in FIG. 21. As is obvious from comparison with FIG. 16, in the sustain circuit in the fourth embodiment, as in the second embodiment, the high-side output semiconductor device 31 and the low-side output semiconductor device 33 are driven using a semiconductor integrated circuit (IC) 80A having a 2-channel input/output terminal and the high-side output semiconductor device 37 and the low-side output semiconductor device 40 are driven using an IC 80B, however, the difference from the sustain circuit in the second embodiment lies in that the high-side output semiconductor device 31 is connected to a positive power source having a voltage of +Vs/2 and the low-side output semiconductor device 33 is connected to, instead of GND, a negative power source that outputs a voltage of −Vs/2. Moreover, the capacitor 39 is removed. In other words, in the PDP apparatus in the fourth embodiment, a voltage of +Vs/2 and a voltage of −Vs/2 are applied alternately to the X electrode and the Y electrode during the sustain period.

Figure 22:
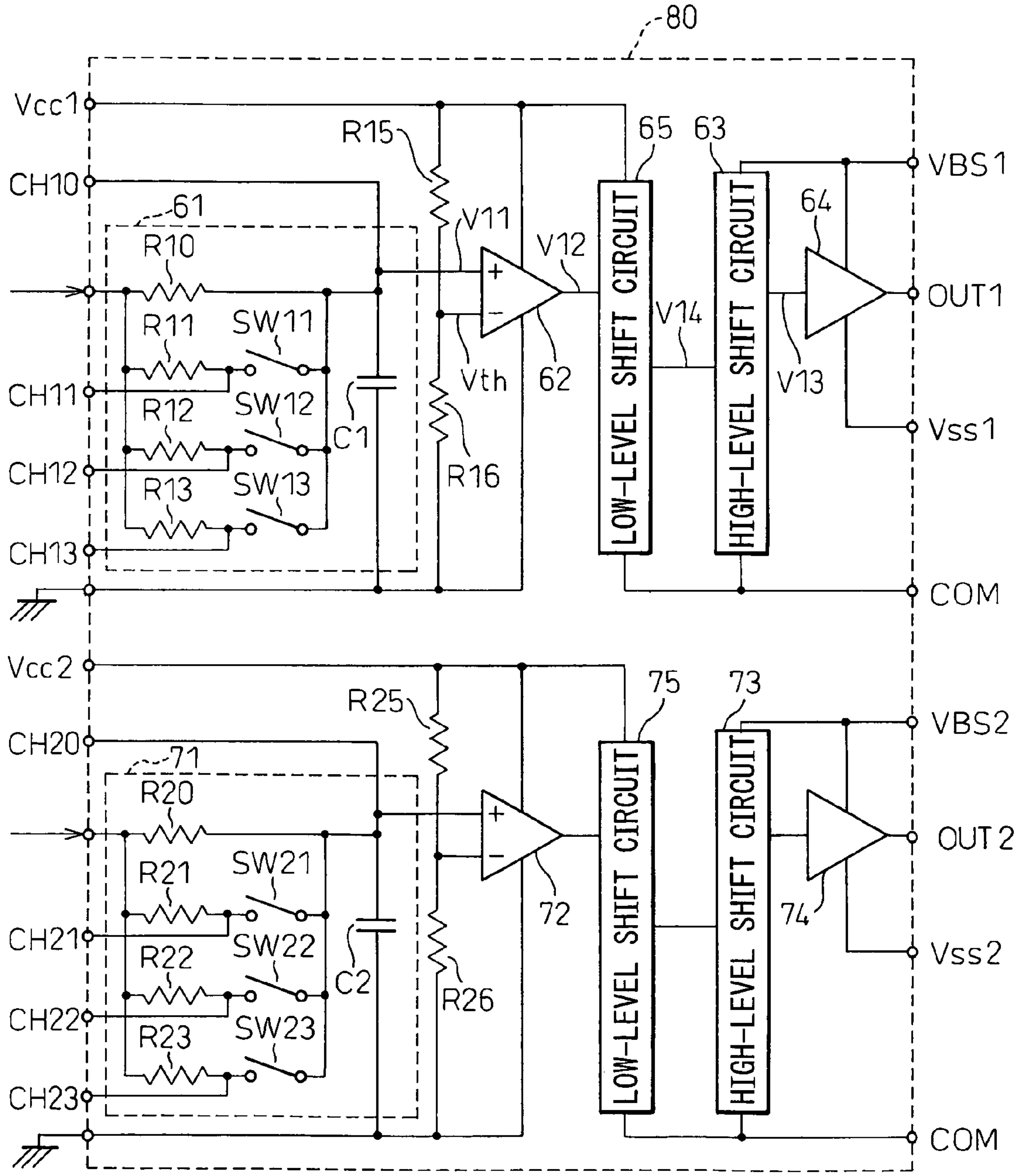
FIG. 22 is a diagram showing the configuration of a semiconductor integrated circuit (IC) used in the sustain circuit in the fourth embodiment.
Figure 23:
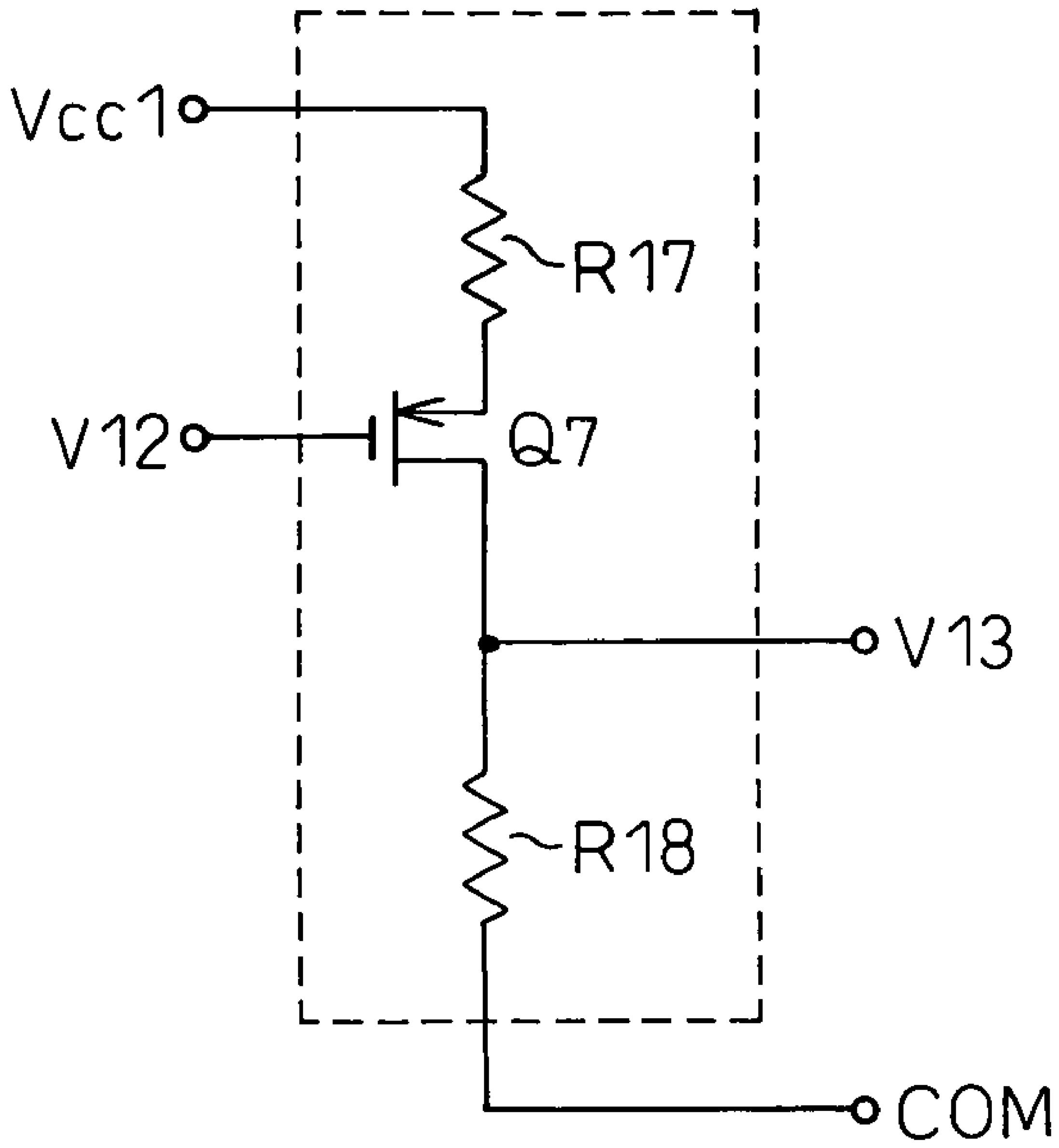
FIG. 23 is a diagram showing the configuration of a low-level shift circuit.

FIG. 22 is a diagram showing the configuration of the IC 80 used in the sustain circuit in the fourth embodiment. The IC 80 differs from the IC in the third embodiment shown in FIG. 18 in that low-level shift circuits 65 and 75 are provided. A specific configuration example of the low-level shift circuit is shown in FIG. 23. As shown in FIG. 23, the low-level shift circuit is constituted of a transistor Q7 and resistors R17 and R18. The low-level shift circuit is a circuit that shifts a signal voltage on the basis of GND into a signal voltage on the basis of a low-level reference voltage COM, which is a negative voltage lower than GND. In the circuit shown in FIG. 22, in order to make the polarities the same, the inputs of the positive terminal and the negative terminal of the comparison circuit 62 in the circuit shown in FIG. 18 are exchanged and the output voltages of the comparison circuit 62 and a comparison circuit 72 are converted into pulses having the negative polarity.

As the IC 80 in the fourth embodiment can operate normally even when the output voltage is set to a voltage lower than GND (0 V), if this is used, a sustain circuit that applies positive and negative voltages alternately to the X electrode and the Y electrode can be realized. Further, by forming the delay time adjustment circuit, comparison circuit, low-level shift circuit, high-level circuit, and output amplifier circuit on a single chip semiconductor integrated circuit (IC), the same effect as that described so far can be obtained. In particular, in the configuration in the fourth embodiment, the variations in the characteristics of devices including the low-level shift circuit and the variations in the input/output delay time depending on the charge in ambient temperature can be kept to a minimum. Further, as the drive circuit for two channels is incorporated, the temperature characteristic of the delay time from IN1 to OUT1 on the high side and the temperature characteristic of the delay time from IN2 to OUT on the low side can be made the same. Due to this, in a half bridge circuit, for example, constituted of a power MOSFET on the high side that is driven by OUT1 and a power MOSFET on the low side that is driven by OUT2, it is possible to more accurately set the drive timing. Because of this, it becomes unlikely that the power MOSFET on the high side and the power MOSFET on the low side turn on simultaneously to cause a penetrating current to flow and, therefore, it becomes possible to make both of the power MOSFETs on the high side and on the low side operate at a higher speed.

Figure 24:
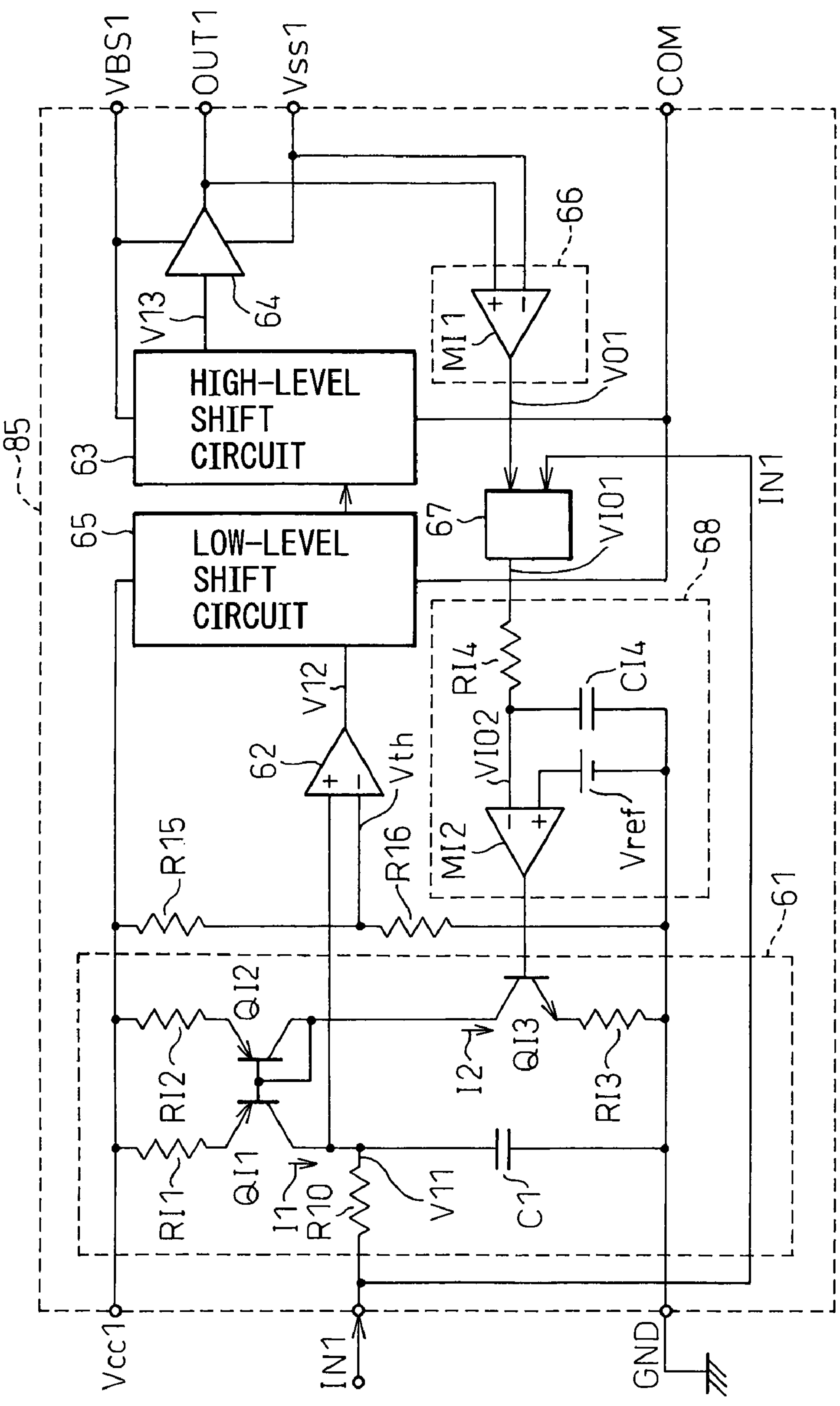
FIG. 24 is a diagram showing the configuration of a semiconductor integrated circuit (IC) used in a sustain circuit in a fifth embodiment.
Figure 25:
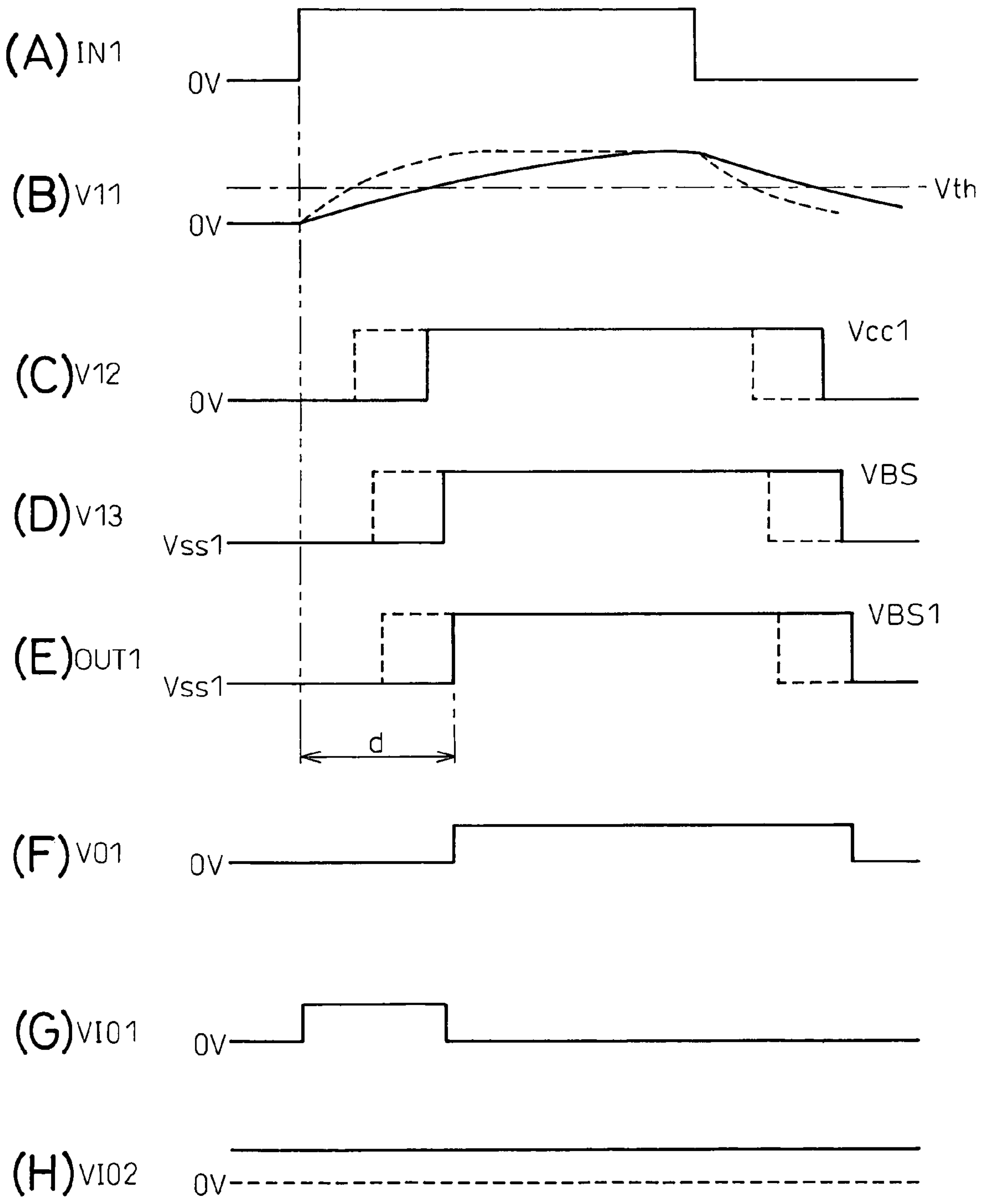
FIG. 25 is a diagram showing waveforms in the semiconductor integrated circuit (IC) in the fifth embodiment.

FIG. 24 is a diagram showing the configuration of an IC used in a sustain circuit in a fifth embodiment of the present invention. The sustain circuit in the fifth embodiment has a configuration in which instead of ICs 80A and 80B, an IC 85 shown in FIG. 24 is used as a drive circuit for driving each of the MOSFETs 31, 33, 38, and 40 in the sustain circuit in the fourth embodiment shown in FIG. 24. By the way, it is also possible to use a two-channel configuration, which is formed by providing the same circuit as that in the IC 85 shown in FIG. 24, instead of the ICs 80A and 80B. FIG. 25 shows operation waveforms in the IC 85 in the fifth embodiment.

As shown in FIG. 24, the IC 85 in the fifth embodiment comprises the delay time adjustment circuit 61, the comparison circuit 62, the low-level shift circuit 65, the high-level shift circuit 63, the output amplifier circuit 64, an output pulse detection circuit 66, an input/output delay time detection circuit 67, and an input/output delay time comparison circuit 68. The comparison circuit 62, the low-level shift circuit 65, the high-level shift circuit 63, and the output amplifier circuit 64 are the same as those in the fourth embodiment.

The delay time adjustment circuit 61 in the fifth embodiment is constituted of the resistor R10 and resistors RI1, RI2, and RI3, a capacitor C1, and transistors QI1, QI2, and QI3. The input/output delay time comparison circuit 68 is constituted of a resistor RI4, a capacitor CI4, a reference voltage source Vref, and a differential amplifier circuit MI2. The output pulse detection circuit 66 is constituted of a differential amplifier circuit MI1.

The operation of the IC in the fifth embodiment is described below. In FIG. 24, the output pulse detection circuit 66 detects an output voltage output from OUT1 and converts the output voltage into an output pulse detection signal VO1 on the basis of GND, as shown in FIG. 25 (F). The input/output delay time detection circuit 67 detects the difference between the front edge of the output pulse detection signal VO1 and the front edge of the input signal IN1 and outputs an input/output delay time detection pulse VIO1 showing the time difference, as shown in FIG. 25(G). The input/output delay time comparison circuit 68 compares the input/output delay time detection pulse VIO1 with a direct current voltage VIO2 obtained by integration in the integral circuit constituted of the resistor RI4 and the capacitor CI4 and the reference voltage Vref and changes the output voltage of the differential amplifier circuit MI2 based on the comparison result.

In the delay time adjustment circuit 61, in accordance with the output voltage of the differential amplifier circuit MI2, a current 12 in a current mirror circuit constituted of the transistors QI1, QI2, and QI3 changes and further, a current 11 changes. When the current 11 changes, a current that charges the capacitor C1 changes, therefore, the time constant at the time of charging the component circuit constituted of the resistor R10 and the capacitor C1 with the input signal IN1 also changes, and the rise of the front edge of the voltage V11 also changes. V12, V13, and OUT1 are the same as those shown in FIG. 9. In this way, it is possible to make the difference between the front edge of the input signal IN1 and the front edge of the output pulse detection signal VO1 constant.

For example, when the current 11 is large, the voltage V11 forms a waveform shown by the broken line and when the current I1 is small, the voltage V11 forms a waveform shown by the solid line as shown in FIG. 25(B). In this way, by controlling the gradient of the rise of the waveform of the voltage V11, it is possible to keep the difference in delay time between the front edges of the input signal IN1 and the output signal OUT1 constant.

By configuring the drive circuit for the power MOSFET in the sustain circuit using the IC in the fifth embodiment, the input/output delay time in each IC becomes a predetermined value regardless of the temperature dependency of the delay time in each circuit block.

Figure 26:
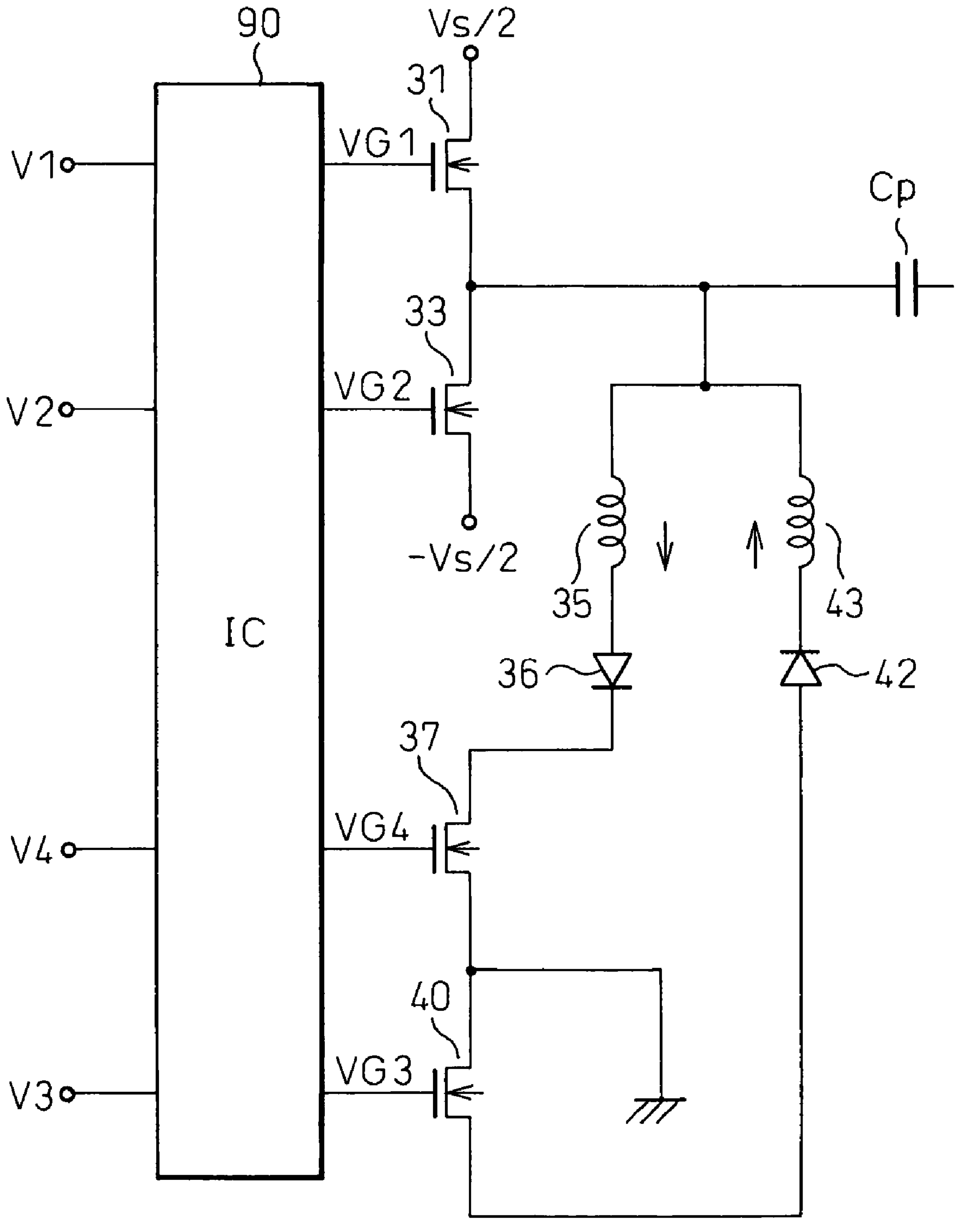
FIG. 26 is a diagram showing the configuration of a sustain circuit in a sixth embodiment.

FIG. 26 is a diagram showing the configuration of a sustain circuit in a PDP apparatus in a sixth embodiment of the present invention. The sustain circuit in the sixth embodiment is characterized in that an IC 90 having four channels is used instead of two ICs having two channels in the sustain circuit in the fourth embodiment. Other parts are the same as those in the fourth embodiment, therefore, a detailed description is not given here.

Figure 27:
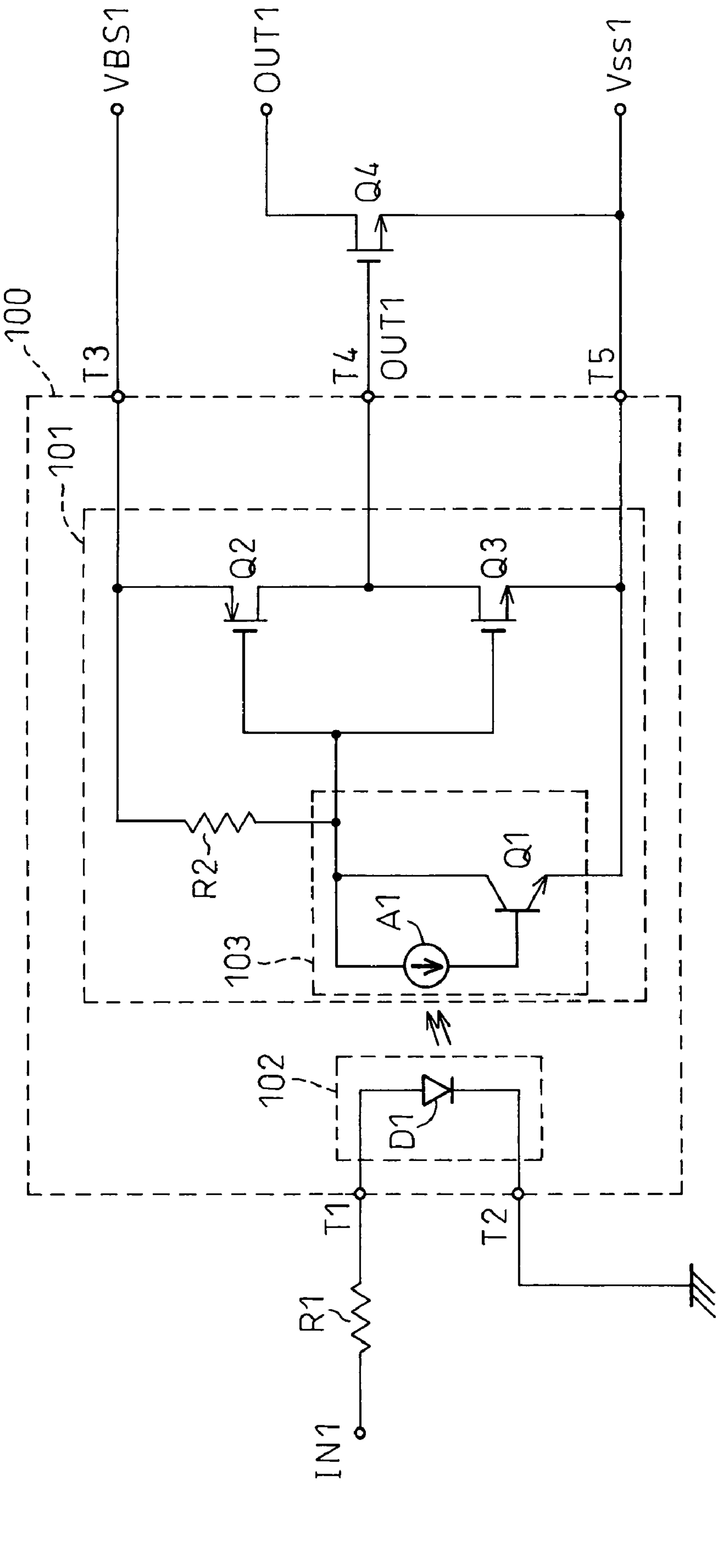
FIG. 27 is a diagram showing the configuration of a pre-drive circuit using a conventional optical transmission circuit.

Conventionally, as described above, in a circuit in which a low-voltage circuit and a high-voltage circuit coexist, two circuits are separated and transmission of signals between circuits is carried out using an optical transmission circuit. FIG. 27 shows an example of a pre-drive circuit 100 using a conventional optical transmission circuit. This circuit is also referred to as a gate coupler and has a light emission section 102 and a light receiving and amplification section 101. As shown in FIG. 27, the light emission section 102 has a light emitting device D1 (for example, a light emitting diode), and the light receiving and amplification section 101 has a light receiving device (a phototransistor) 103 constituted of a photoelectric current conversion device A1 and a transistor Q1, a resistor R2, a P-channel FET Q2, and an N-channel FET Q3. Q4 is an output device.

In the circuit shown in FIG. 27, the light emitting device D1 is made to emit light by an input signal inputted to an input terminal T1 via the resistor R1. The light signal emitted from the light emitting device D1 is converted into an electric signal in the photoelectric current conversion device A1, and is supplied to the base terminal of the transistor Q1. Further, the signal is amplified in voltage by the transistor Q1 and the resistor R1 and, after amplified in current intensity by Q2 and Q3, is output from an output terminal T4 as an output signal. In the circuit shown in FIG. 27, the above-mentioned output signal carries out the switching of the output device Q4. In FIG. 27, reference symbol T3 denotes a power supply input voltage terminal and reference symbol T5 denotes an output reference terminal.

When the pre-drive circuit using the above-mentioned optical transmission circuit is used in the sustain circuit in a plasma display apparatus, the variations in delay time of each part also causes a problem. Further, when a delay time adjustment circuit constituted of discrete parts is configured as an external circuit of a drive circuit constituted of semiconductor integrated circuits, the difference in temperature characteristic causes a problem as described above. A circuit in a seventh embodiment, to be described below, solves these problems.

Figure 28:
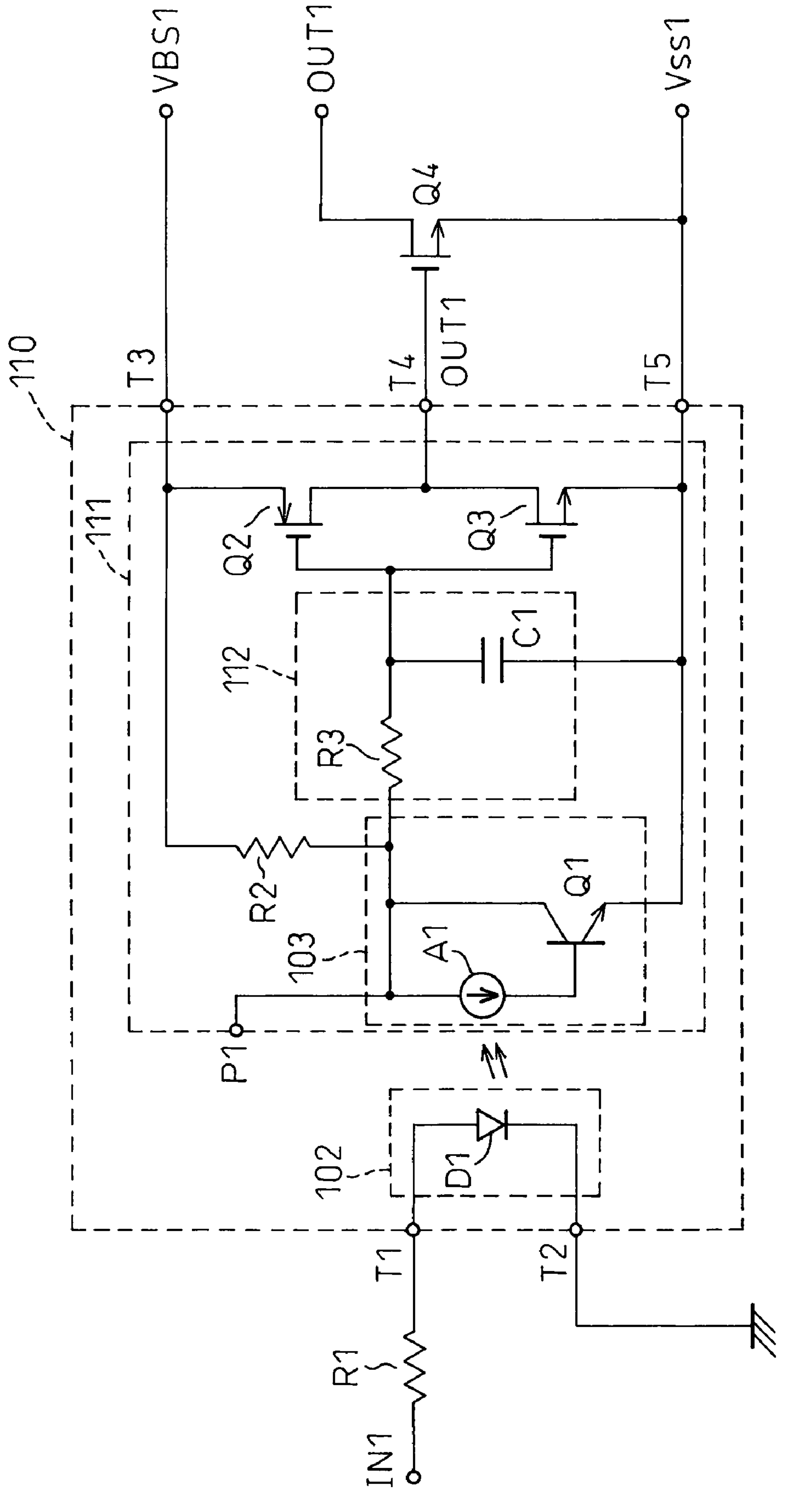
FIG. 28 is a diagram showing the configuration of a pre-drive circuit using a optical transmission circuit in a seventh embodiment of the present invention.

A plasma display apparatus in the seventh embodiment of the present invention has the same general configuration as that in the first embodiment and the pre-drive circuit in the sustain circuit is configured by using a semiconductor integrated circuit using the optical transmission circuit shown in FIG. 28. The circuit shown in FIG. 28 differs from the conventional circuit shown in FIG. 27 in that a light receiving and amplification section 111 is provided with a delay time adjustment circuit 112 constituted of a resistor R3 and the capacitor C1 and a test signal input terminal P1. In the circuit shown in FIG. 28, the light emitting section 102 constituted of the light emitting device D1 is configured as a first semiconductor chip and the light receiving and amplification section 111 as a second semiconductor chip. The two semiconductor chips are incorporated in a single case and thus a pre-drive circuit, constituted of semiconductor devices referred to as gate couplers, is formed.

Figure 29:
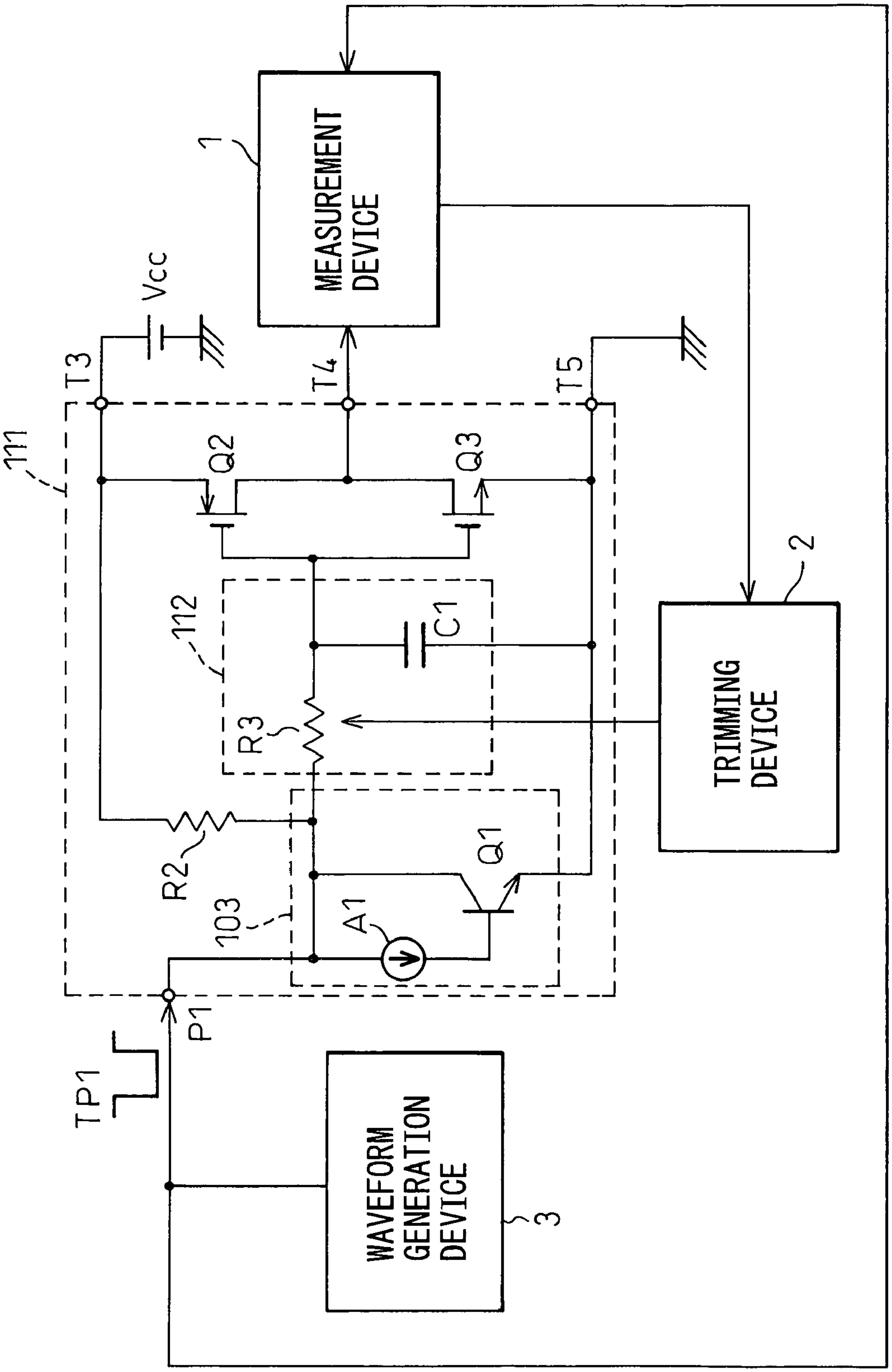
FIG. 29 is a diagram showing a method for setting a delay time of the pre-drive circuit in the seventh embodiment.

FIG. 29 is a diagram for explaining a method for setting a delay time when manufacturing the second semiconductor chip having the light receiving and amplification section 111 of a semiconductor device IC 110 in the seventh embodiment. As shown in FIG. 29, a test signal TP1 generated in the waveform generation circuit 3 is inputted to the light receiving and amplification section 111 from the test signal input terminal P1. The inputted test signal TP1 is inputted to the delay time adjustment circuit 112 via the light receiving section 103. The delay time adjustment circuit 112 is configured as a time constant circuit and constituted of a trimming resistor R3 and the capacitor C1 and adjusts a delay time by changing the time constant of the time constant circuit. Q2 and Q3 amplify the signal in current intensity supplied from the delay time adjustment circuit 112 and outputs the signal from the output terminal T4. There may be a case where a waveform shaping circuit is provided between the delay time adjustment circuit 112 and Q2 and Q3 in order to shape a waveform.

As shown in FIG. 29, the test signal TP1 generated in the waveform generation circuit 3 is inputted also to the measurement device 1. The measurement device 1 compares the timings of the rising or falling edges of the output signal output from the output terminal T4 and the test signal TP1 and calculates the timing difference. The measurement device 1 determines, based on the timing difference, the resistance of the trimming resistor R3, that is, the amount of trimming of the trimming resistor R3 so that the delay time in the light receiving and amplification section 111 falls within a predetermined range and sends data indicating the amount of trimming to the trimming device 2. The trimming device 2 carries out trimming of the trimming resistor R3 based on the data indicating the amount of trimming sent from the measurement device 1. As a trimming method, for example, a method in which the resistor R3 formed on a semiconductor chip is irradiated with laser beams to cut the resistor and change the resistance can be used. By carrying out trimming as described above, it is possible to set the delay time in the light receiving and amplification section 111 formed on the second semiconductor chip within a predetermined range. In the case of the semiconductor integrated circuit (IC) in the seventh embodiment, the light receiving device A1, the amplifier circuit, and the delay time adjustment circuit 112 are formed in the same semiconductor chip, therefore, it is possible to make the change in delay time depending on ambient temperature (the temperature characteristic) the same. As a result, the variations in temperature characteristic between parts can be reduced. By the way, the light emitting device D1 operates at a very high speed, the delay time thereof is small, and the variations in delay time are also small, therefore, it is possible to ignore the delay time in the light emitting section 102 and the variations in delay time, and no problem is caused as long as the delay time in the light receiving and amplification section falls within the predetermined range.

Figure 30:
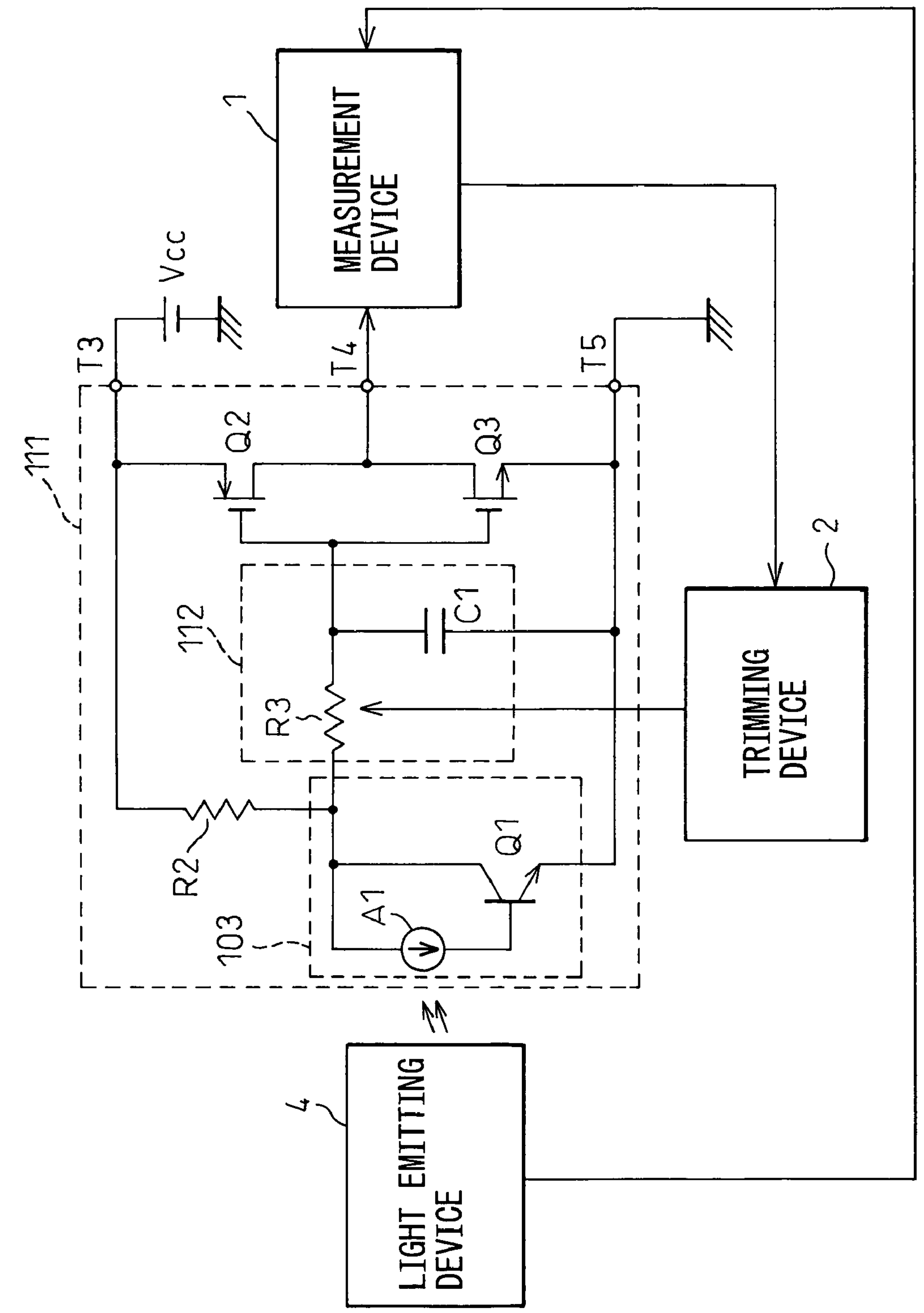
FIG. 30 is a diagram showing another method for setting a delay time of the pre-drive circuit in the seventh embodiment.

FIG. 30 is a diagram showing another method of setting a delay time in the semiconductor integrated circuit in the seventh embodiment. The method shown in FIG. 30 differs from the method shown in FIG. 29 in that a light emitting device 4 is used instead of the waveform generation device 3. The light emitting device 4 supplies a light signal, which is a test signal, to the light receiving device in the second semiconductor chip and at the same time, supplies a signal in synchronization with the light signal to the measurement device 1. The light receiving section 103 generates a signal in response to the light signal and supplies the signal to the delay time adjustment circuit 112. The rest of the method is the same as that in the method shown in FIG. 29. In the method shown in FIG. 30, it is possible to more accurately adjust a delay time compared to the method shown in FIG. 29 because a signal is generated in the light receiving section 103 in accordance with a light signal inputted to the light receiving device A1, which is similar to a state of being actually used.

Figure 31:
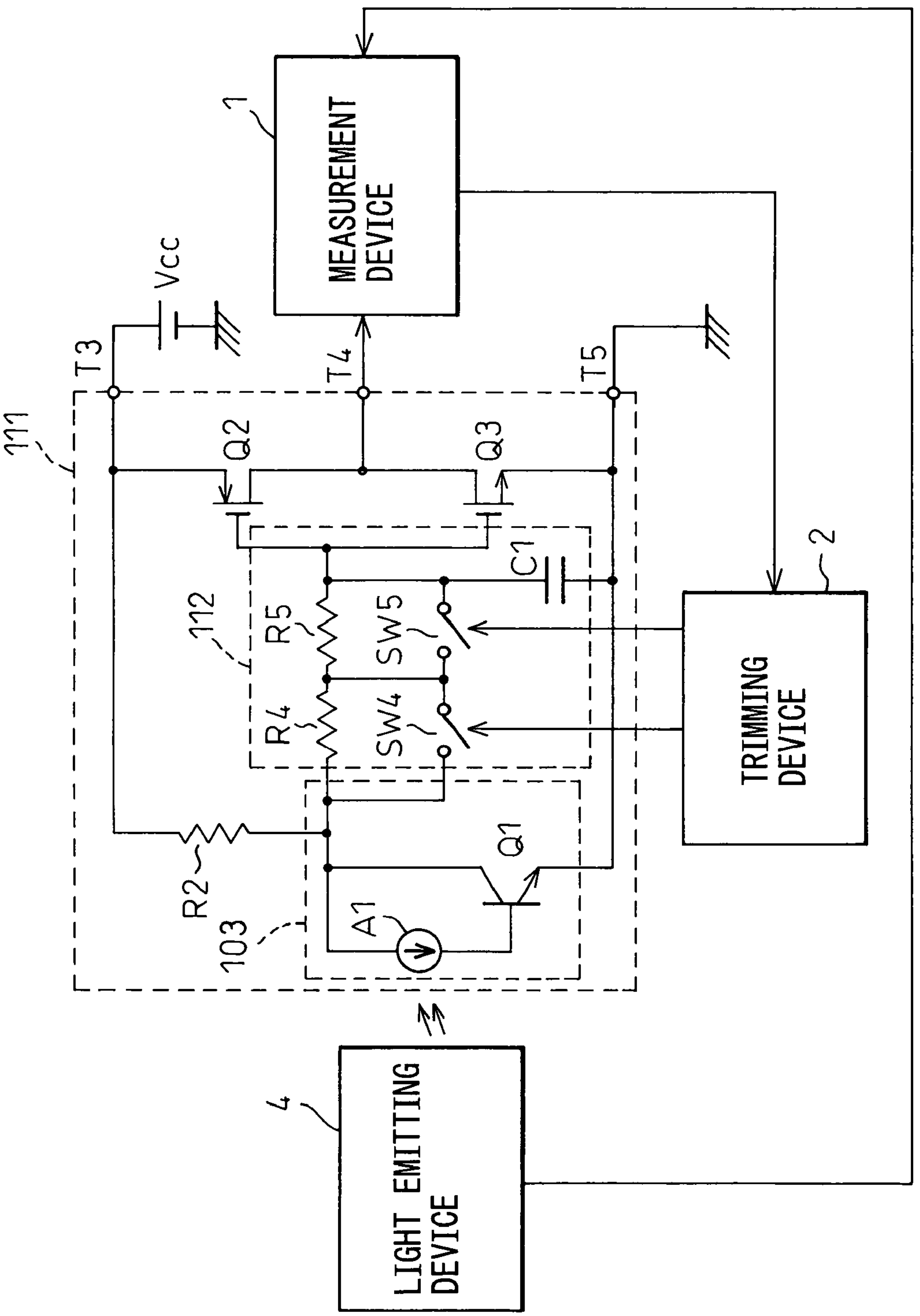
FIG. 31 is a diagram showing another method for setting a delay time of the pre-drive circuit in the seventh embodiment.

FIG. 31 is a diagram showing another method when setting a delay time in the semiconductor integrated circuit in the seventh embodiment. The delay time adjustment circuit 112 for setting a delay time in the method shown FIG. 31 differs from the delay time adjustment circuit in the seventh embodiment shown in FIG. 28 in that a circuit in which a circuit constituted of a resistor R4 and a switch SW4 connected in parallel and a circuit constituted of a resistor R5 and a switch SW5 connected in parallel are connected in series is used instead of the trimming resistor. The switches SW4 and SW5 can be realized by the configuration shown in FIG. 11 to FIG. 13 and a delay time can be adjusted by selecting the on/off state of the switches. The method shown in FIG. 31 uses the light emitting device 4 as in the method shown in FIG. 30. The trimming device 2 sets the on/off state of the switches SW4 and SW5 based on the setting data from the measurement device 1.

Figure 32:
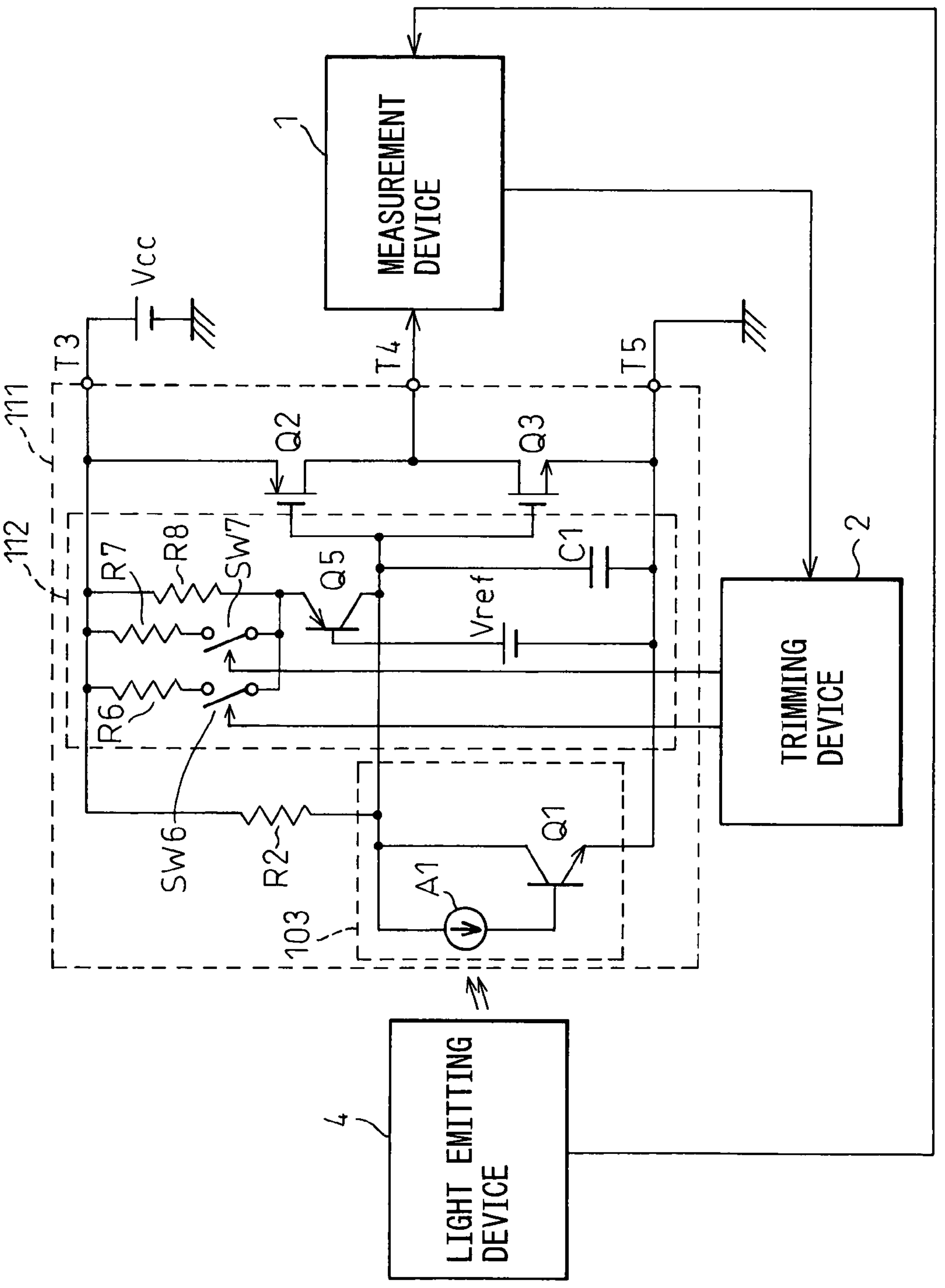
FIG. 32 is a diagram showing another method for setting a delay time of the pre-drive circuit in the seventh embodiment.

FIG. 32 is a diagram showing another method when setting a delay time in the semiconductor integrated device in the seventh embodiment. The delay time adjustment circuit 112 for setting a delay time in the method shown in FIG. 31 differs from the delay time adjustment circuit 112 shown in FIG. 28 in that a constant current circuit capable of adjusting a current is provided instead of the trimming resistor R3. The constant current circuit is configured by connecting a PNP junction type transistor Q5 and a resistor R8 between the high-side power supply line and the terminal of the capacitor C1, applying a voltage of a constant voltage source Vref to the source of Q5, and connecting a series circuit constituted of a resistor R6 and a switch SW6 and a series circuit constituted of a resistor R7 and a switch SW7 to the resistor R8 in parallel. The constant current circuit adjusts a delay time by selecting the on/off state of the switches SW6 and SW7 to change the current value for charging the capacitor C1 via the transistor Q5.

The method shown in FIG. 32 uses the light emitting device 4 as in the methods shown in FIG. 30 and FIG. 31.

Although the embodiments of the present invention are described as above, there can be various modifications and the featured parts in each embodiment can also be applied to another embodiment. For example, the configuration explained in the first and fifth embodiments can be applied to the IC having four channels as in the sixth embodiment. Further, the configuration in which the front edges of the input signal and the output signal are compared in the fifth embodiment can also be applied to a configuration in which a negative voltage is not used.

Moreover, the delay time adjustment circuit shown in FIG. 14 can also be applied to the delay time adjustment circuit in the seventh embodiment.

As described above, according to the present invention, even when ambient temperature varies, the output signal in each drive circuit for driving each output semiconductor device is kept in an optimum state, therefore, a state in which the power consumption is low is maintained in a PDP apparatus and the PDP apparatus can be operated stably. Due to this, a plasma display with low power consumption but high reliability can be realized.

We claim:

1. A semiconductor integrated circuit for driving a semiconductor device, comprising:
- a delay time adjustment circuit for delaying the rising edge or the falling edge of an input signal and changing the amount of delay;
- a comparison circuit for comparing an output signal from the delay time adjustment circuit with a predetermined voltage;
- a high-level shift circuit for shifting an output signal from the comparison circuit into a signal on the basis of an output reference voltage; and
- an output amplifier circuit for amplifying an output signal from the high-level shift circuit and outputting a signal for driving the semiconductor device,
- wherein the delay time adjustment circuit, the comparison circuit, the high-level shift circuit, and the output amplifier circuit are formed on a single chip.

2. The semiconductor integrated circuit as set forth in claim 1, wherein the delay time adjustment circuit comprises a resistor, a switch, or a capacitor formed in the single chip semiconductor integrated circuit.

3. The semiconductor integrated circuit as set forth in claim 2, wherein:
- the delay time adjustment circuit comprises a resistor-row circuit formed in the single chip semiconductor integrated circuit and in which plural rows of resistors and switches connected in series are connected in parallel and a capacitor formed in the single chip semiconductor integrated circuit and connected between the resistor-row circuit and a ground terminal; and
- a delay time is adjusted by opening and closing the plural switches.

4. The semiconductor integrated circuit as set forth in claim 2, wherein:
- the delay time adjustment circuit comprises a capacitor-row circuit formed in the single chip semiconductor integrated circuit and in which plural rows of capacitors and switches connected in series are connected in parallel and a resistor formed in the single chip semiconductor integrated circuit and connected between the capacitor-row circuit and an input terminal; and
- a delay time is adjusted by opening and closing the plural switches.

5. The semiconductor integrated circuit as set forth in claim 2, wherein the switch has a bipolar transistor and in order to bring the bipolar transistor into conduction, the junction between the emitter and the base is short-circuited by applying a high voltage between the emitter and the base of the bipolar transistor 6. The semiconductor integrated circuit as set forth in claim 2, wherein the switch has a resistor for switching or an aluminum wire for switching formed in the single chip semiconductor integrated circuit and in order to bring the switch into a cutoff state, the resistor for switching or the aluminum wire for switching is cut.

7. The semiconductor integrated circuit as set forth in claim 1, wherein the temperature characteristic of delay time of a signal generated by the delay time adjustment circuit and the temperature characteristic of delay time of a signal generated by circuits other than the delay time adjustment circuit are substantially the same.

8. The semiconductor integrated circuit as set forth in claim 1, wherein:
- the delay time adjustment circuit comprises a trimming resistor formed in the single chip semiconductor integrated circuit and a capacitor connected to the trimming resistor; and
- a delay time is adjusted by trimming the trimming resistor using a laser.

9. A plasma display apparatus using the semiconductor integrated circuit set forth in claim 1 in a pre-drive circuit of a semiconductor device for driving electrodes of the plasma display panel.

10. A plasma display apparatus, comprising:
- a plurality of first electrodes and a plurality of second electrodes arranged adjacently by turns;
- a first electrode drive circuit having a semiconductor device for applying a discharge voltage to the plurality of first electrodes; and
- a second electrode drive circuit having a semiconductor device for applying a discharge voltage to the plurality of second electrodes,
- wherein:
- a discharge is caused to occur between neighboring ones of the first electrode and second electrode; and
- the first electrode drive circuit or the second electrode drive circuit comprises the semiconductor integrated circuit set forth in claim 1 as a drive circuit for driving the semiconductor device.

11. A semiconductor integrated circuit for driving a semiconductor device, comprising:
- a delay time adjustment circuit for changing the amount of delay of the rising edge or the falling edge of an input signal;
- a comparison circuit for comparing an output signal from the delay time adjustment circuit with a predetermined voltage;
- a low-level shift circuit for shifting an output signal from the comparison circuit into a signal on the basis of a low-level reference voltage;
- a high-level shift circuit for shifting an output signal from the low-level shift circuit into a signal on the basis of an output reference voltage; and
- an output amplifier circuit for amplifying an output signal from the high-level shift circuit and outputting a signal for driving the semiconductor device,
- wherein the delay time adjustment circuit, the comparison circuit, the low-level shift circuit, the high-level shift circuit, and the output amplifier circuit are formed on a single chip.

12. The semiconductor integrated circuit as set forth in claim 11, wherein the delay time adjustment circuit comprises a resistor, a switch, or a capacitor formed in the single chip semiconductor integrated circuit.

13. The semiconductor integrated circuit as set forth in claim 12, wherein:
- the delay time adjustment circuit comprises a resistor-row circuit formed in the single chip semiconductor integrated circuit and in which plural rows of resistors and switches connected in series are connected in parallel and a capacitor formed in the single chip semiconductor integrated circuit and connected between the resistor-row circuit and a ground terminal; and
- a delay time is adjusted by opening and closing the plural switches.

14. The semiconductor integrated circuit as set forth in claim 12, wherein:
- the delay time adjustment circuit comprises a capacitor-row circuit formed in the single chip semiconductor integrated circuit and in which plural rows of capacitors and switches connected in series are connected in parallel and a resistor formed in the single chip semiconductor integrated circuit and connected between the capacitor-row circuit and an input terminal; and a delay time is adjusted by opening and closing the plural switches.

15. The semiconductor integrated circuit as set forth in claim 12, wherein the switch has a bipolar transistor and in order to bring the bipolar transistor into conduction, the junction between the emitter and the base is shod-circuited by applying a high voltage between the emitter and the base of the bipolar transistor.

16. The semiconductor integrated circuit as set forth in claim 12, wherein the switch has a resistor for switching or an aluminum wire for switching formed in the single chip semiconductor integrated circuit and in order to bring the switch into a cutoff state, the resistor for switching or the aluminum wire for switching is cut.

17. The semiconductor integrated circuit as set forth in claim 11, wherein the temperature characteristic of delay time of a signal generated by the delay time adjustment circuit and the temperature characteristic of delay time of a signal generated by circuits other than the delay time adjustment circuit are substantially the same.

18. The semiconductor integrated circuit as set forth in claim 11, wherein:

the delay time adjustment circuit comprises a trimming resistor formed in the single chip semiconductor integrated circuit and a capacitor connected to the trimming resistor; and a delay time is adjusted by trimming the trimming resistor using a laser.

19. The semiconductor integrated circuit as set forth in claim 18, wherein the first and second delay time adjustment circuits comprise a resistor, a switch, or a capacitor formed in the single chip semiconductor integrated circuit.

20. The semiconductor integrated circuit as set forth in claim 18, wherein:

the first and second delay time adjustment circuits comprise a trimming resistor formed in the single chip semiconductor integrated circuit and a capacitor connected to the trimming resistor; and a delay time is adjusted by trimming the trimming resistor using a laser.

21. The semiconductor integrated circuit as set forth in claim 20, wherein the second semiconductor chip comprises a test signal input terminal.

22. The semiconductor integrated circuit as set forth in claim 20, wherein the delay time adjustment circuit comprises a resistor, a switch, or a capacitor formed in the second semiconductor chip.

23. The semiconductor integrated circuit as set forth in claim 20, wherein:

the delay time adjustment circuit comprises a resistor-row circuit formed in the second semiconductor chip and in which plural rows of resistors and switches connected in series are connected in parallel and a capacitor connected between the resistor-row circuit and a ground terminal; and a delay time is adjusted by opening and closing the plural switches.

24. The semiconductor integrated circuit as set forth in claim 20, wherein the delay time adjustment circuit comprises a capacitor-row circuit formed in the second semiconductor chip and in which plural rows of capacitors and switches connected in series are connected in parallel and a resistor connected between the capacitor-row circuit and an input terminal; and a delay time is adjusted by opening and closing the plural switches.

25. The semiconductor integrated circuit as set forth in claim 21, wherein the switch has a bipolar transistor and, in order to bring the bipolar transistor into conduction, the junction between the emitter and the base is short-circuited by applying a high voltage between the emitter and the base of the bipolar transistor.

26. The semiconductor integrated circuit as set forth in claim 21, wherein the switch has a resistor for switching or an aluminum wire for switching formed in the second semiconductor chip and, in order to bring the switch into a cutoff state, the resistor for switching or the aluminum wire for switching is cut.

27. The semiconductor integrated circuit as set forth in claim 20, wherein the delay time adjustment circuit is composed of a constant current circuit and a capacitor and the delay time thereof changes as the current value in the constant current circuit changes.

28. The semiconductor integrated circuit as set forth in claim 26, wherein the constant current circuit is composed of a transistor, the output terminal of which is connected to the capacitor, a current adjusting resistor connected to the input terminal of the transistor, and a constant voltage circuit connected to the control terminal of the transistor.

29. The semiconductor integrated circuit as set forth in claim 27, wherein the constant current circuit comprises at least one row of a resistor and a switch connected in series provided in parallel to the current adjusting resistor and the current supplied to the capacitor changes as the switch opens and closes.

30. The semiconductor integrated circuit as set forth in claim 20, wherein the temperature characteristic of delay time of a signal generated by the delay time adjustment circuit and the temperature characteristic of delay time of a signal generated by circuits other than the delay time adjustment circuit are substantially the same.

31. The semiconductor integrated circuit as set forth in claim 20, wherein the temperature characteristic of delay time of a signal generated by the delay time adjustment circuit formed on the second semiconductor chip and the temperature characteristic of delay time of a signal generated by circuits other than the delay time adjustment circuit formed on the second semiconductor chip are substantially the same.

32. A plasma display apparatus using the semiconductor integrated circuit set forth in claim 11 in a pre-drive circuit of a semiconductor device for driving electrodes of the plasma display panel.

33. A plasma display apparatus using the semiconductor integrated circuit set forth in claim 18 in a pre-drive circuit of a semiconductor device for driving electrodes of the plasma display panel.

34. A plasma display apparatus using the semiconductor integrated circuit set forth in claim 20 in a pre-drive circuit of a semiconductor device for driving electrodes of the plasma display panel.

35. A plasma display apparatus using the drive circuit set forth in claim 31 in a pre-drive circuit of a semiconductor device for driving electrodes of the plasma display panel.

36. A plasma display apparatus, comprising:

a plurality of first electrodes and a plurality of second electrodes arranged adjacently by turns;

a first electrode drive circuit having a semiconductor device for applying a discharge voltage to the plurality of first electrodes; and a second electrode drive circuit having a semiconductor device for applying a discharge voltage to the plurality of second electrodes, wherein:

a discharge is caused to occur between neighboring ones of the first electrode and second electrode; and the first electrode drive circuit or the second electrode drive circuit comprises the semiconductor integrated circuit set forth in claim 2 as a drive circuit for driving the semiconductor device.

37. A plasma display apparatus, comprising:

a plurality of first electrodes and a plurality of second electrodes arranged adjacently by turns;

a first electrode drive circuit having a semiconductor device for applying a discharge voltage to the plurality of first electrodes; and a second electrode drive circuit having a semiconductor device for applying a discharge voltage to the plurality of second electrodes, wherein:

a discharge is caused to occur between neighboring ones of the first electrode and second electrode; and the first electrode drive circuit or the second electrode drive circuit comprises the semiconductor integrated circuit set forth in claim 16 as a drive circuit for driving the semiconductor device.

38. A plasma display apparatus, comprising;

a plurality of first electrodes and a plurality of second electrodes arranged adjacently by turns;

a first electrode drive circuit having a semiconductor device for applying a discharge voltage to the plurality of first electrodes; and a second electrode drive circuit having a semiconductor device for applying a discharge voltage to the plurality of second electrodes, wherein:

a discharge is caused to occur between neighboring ones of the first electrode and second electrode; and the first electrode drive circuit or the second electrode drive circuit comprises the semiconductor integrated circuit set forth in claim 28 as a drive circuit for driving the semiconductor device.

39. A semiconductor integrated circuit for driving first and second semiconductor devices, comprising:

a first delay time adjustment circuit for delaying the rising edge or the falling edge of a first input signal and changing the amount of delay;

a first comparison circuit for comparing an output signal from the first delay time adjustment circuit with a predetermined voltage;

a high-level shift circuit for shifting an output signal from the first comparison circuit into a signal on the basis of an output reference voltage;

a first output amplifier circuit for amplifying an output signal from the high-level shift circuit and outputting a first signal for driving the first semiconductor device;

a second delay time adjustment circuit for delaying the rising edge or the falling edge of a second input signal and changing the amount of delay;

a second comparison circuit for comparing an output signal from the second delay time adjustment circuit with a predetermined voltage; and a second output amplifier circuit for amplifying an output signal from the second comparison circuit and outputting a second signal for driving the second semiconductor device, wherein the first delay time adjustment circuit, the first comparison circuit, the high-level shift circuit, the first output amplifier circuit, the second delay time adjustment circuit, the second comparison circuit, and the second output amplifier circuit are formed on a single chip.

40. A semiconductor integrated circuit for driving first and second semiconductor devices, comprising:

a first delay time adjustment circuit for delaying the rising edge or the falling edge of a first input signal and changing the amount of delay;

a first comparison circuit for comparing an output signal from the first delay time adjustment circuit with a predetermined voltage;

a first high-level shift circuit for shifting an output signal from the first comparison circuit into a signal on the basis of a first output reference voltage;

a first output amplifier circuit for amplifying an output signal from the first high-level shift circuit and outputting a first signal for driving the first semiconductor device;

a second delay time adjustment circuit for delaying the rising edge or the falling edge of a second input signal and changing the amount of delay;

a second comparison circuit for comparing an output signal from the second delay time adjustment circuit with a predetermined voltage;

a second high-level shift circuit for shifting an output signal from the second comparison circuit into a signal on the basis of a second output reference voltage; and a second output amplifier circuit for amplifying an output signal from the second high-level shift circuit and outputting a second signal for driving the second semiconductor device, wherein the first delay time adjustment circuit, the first comparison circuit, the first high-level shift circuit, the first output amplifier circuit, the second delay time adjustment circuit, the second comparison circuit, the second high-level shift circuit, and the second output amplifier circuit are formed on a single chip.

41. A semiconductor integrated circuit for driving first and second semiconductor devices, comprising:

a first delay time adjustment circuit for delaying the rising edge or the falling edge of a first input signal and changing the amount of delay;

a first comparison circuit for comparing an output signal from the first delay time adjustment circuit with a predetermined voltage;

a first low-level shift circuit for shifting an output signal from the first comparison circuit into a signal on the basis of a first low-level reference voltage;

a high-level shift circuit for shifting an output signal from the first low-level shift circuit into a signal on the basis of an output reference voltage;

a first output amplifier circuit for amplifying an output signal from the high-level shift circuit and outputting a first signal for driving the first semiconductor device;

a second delay time adjustment circuit for delaying the rising edge or the falling edge of a second input signal and changing the amount of delay;

a second comparison circuit for comparing an output signal from the second delay time adjustment circuit with a predetermined voltage;

a second low-level shift circuit for shifting an output signal from the second comparison circuit into a signal on the basis of a second low-level reference voltage; and a second output amplifier circuit for amplifying an output signal from the second low-level shift circuit and outputting a second signal for driving the second semiconductor device, wherein the first delay time adjustment circuit, the first comparison circuit, the first low-level shift circuit, the high-level shift circuit, the first output amplifier circuit, the second delay time adjustment circuit, the second comparison circuit, the second low-level shift circuit, and the second output amplifier circuit are formed on a single chip.

42. A semiconductor integrated circuit for driving first and second semiconductor devices, comprising:

a first delay time adjustment circuit for delaying the rising edge or the falling edge of a first input signal and changing the amount of delay;

a first comparison circuit for comparing an output signal from the first delay time adjustment circuit with a predetermined voltage;

a first low-level shift circuit for shifting an output signal from the first comparison circuit into a signal on the basis of a first low-level reference voltage;

a first high-level shift circuit for shifting an output signal from the first low-level shift circuit into a signal on the basis of a first output reference voltage;

a first output amplifier circuit for amplifying an output signal from the first high-level shift circuit and outputting a first signal for driving the first semiconductor device;

a second delay time adjustment circuit for delaying the rising edge or the falling edge of a second input signal and changing the amount of delay;

a second comparison circuit for comparing an output signal from the second delay time adjustment circuit with a predetermined voltage;

a second low-level shift circuit for shifting an output signal from the second comparison circuit into a signal on the basis of a second low-level reference voltage;

a second high-level shift circuit for shifting an output signal from the second low-level shift circuit into a signal on the basis of a second output reference voltage; and a second output amplifier circuit for amplifying an output signal from the second high-level shift circuit and outputting a second signal for driving the second semiconductor device, wherein the first delay time adjustment circuit, the first comparison circuit, the first low-level shift circuit, the first high-level shift circuit, the first output amplifier circuit, the second delay time adjustment circuit, the second comparison circuit, the second low-level shift circuit, the second high-level shift circuit, and the second output amplifier circuit are formed on a single chip.

43. The semiconductor integrated circuit as set forth in claim 42, wherein:

the first and second delay time adjustment circuits comprise a resistor-row circuit formed in the single chip semiconductor integrated circuit and in which plural rows of resistors and switches connected in series are connected in parallel and a capacitor formed in the single chip semiconductor integrated circuit and connected between the resistor-row circuit and a ground terminal; and a delay time is adjusted by opening and closing the plural switches.

44. The semiconductor integrated circuit as set forth in claim 42, wherein:

the first and second delay time adjustment circuits comprise a capacitor-row circuit formed in the single chip semiconductor integrated circuit and in which plural rows of capacitors and switches connected in series are connected in parallel and a resistor formed in the single chip semiconductor integrated circuit and connected between the capacitor-row circuit and an input terminal; and a delay time is adjusted by opening and closing the plural switches.

45. The semiconductor integrated circuit as set forth in claim 42, wherein the switch has a bipolar transistor and in order to bring the bipolar transistor into conduction, the junction between the emitter and the base is short-circuited by applying a high voltage between the emitter and the base of the bipolar transistor.

46. The semiconductor integrated circuit as set forth in claim 42, wherein the switch has a resistor for switching formed in the single chip semiconductor integrated circuit and, in order to bring the switch into a cutoff state, the resistor for switching is cut by making an overcurrent flow therethrough.

47. The semiconductor integrated circuit as set forth in claim 42, wherein the switch has a resistor for switching formed in the single chip semiconductor integrated circuit and, in order to bring the switch into a cutoff state, the resistor for switching is cut using a laser.

48. The semiconductor integrated circuit as set forth in claim 42, wherein the switch has an aluminum wire for switching formed in the single chip semiconductor integrated circuit and, in order to bring the switch into a cutoff state, the aluminum wire for switching is cut by making an overcurrent flow therethrough. comprises the semiconductor integrated circuit set forth in claim 16 as a drive circuit for driving the semiconductor device.

49. A semiconductor integrated circuit, comprising a single package containing;

a first semiconductor chip having an input terminal and a light emitting device for converting an electric signal inputted from the input terminal into a light signal; and a second semiconductor chip having a light receiving device for converting the light signal emitted from the light emitting device into an electric signal and an amplifier circuit for amplifying the electric signal obtained from the light receiving device, wherein the second semiconductor chip comprises a delay time adjustment circuit for delaying the rising edge or the falling edge of the electric signal obtained from the light receiving device to adjust a delay time.

50. A drive circuit for driving a semiconductor device, comprising:

a delay time adjustment circuit for delaying the rising edge or the falling edge of an input signal and changing the amount of delay;

a comparison circuit for comparing an output signal from the delay time adjustment circuit with a predetermined voltage;

a high-level shift circuit for shifting an output signal from the comparison circuit into a signal on the basis of an output reference voltage; and an output amplifier circuit for amplifying an output signal from the high-level shift circuit and outputting a signal for driving the semiconductor device, wherein the temperature characteristic of delay time of a signal generated by the delay time adjustment circuit and the temperature characteristic of delay time of a signal generated by circuits other than the delay time adjustment circuit are substantially the same.

51. The plasma display apparatus as set forth in claim 50, wherein the pre-drive circuit is a circuit for driving an output device for a sustain circuit for supplying a sustain pulse.

* * * * *

UNITED STATES PATENT AND TRADEMARK OFFICE

CERTIFICATE OF CORRECTION

PATENT NO. : 7,511,441 B2
APPLICATION NO. : 11/089000
DATED : March 31, 2009
INVENTOR(S) : Makoto Onozawa et al.

It is certified that error appears in the above-identified patent and that said Letters Patent is hereby corrected as shown below:

Column 21, Line 53, after "transistor" insert --.--.

Column 23, Line 8, change "shod-circuited" to --short-circuited--.

Column 25, Line 3, change "claim 2" to --claim 11--.

Column 25, Line 19, change "claim 16" to --claim 18--.

Column 25, Line 21, change "comprising;" to --comprising:--.

Column 28, Lines 25-27, after "therethrough." delete "comprises the semiconductor integrated circuit set forth in claim 16 as a drive circuit for driving the semiconductor device.".

Column 28, Line 29, change "containing;" to --containing:--.

Signed and Sealed this

Twenty-eighth Day of July, 2009

John Doll

JOHN DOLL
*Acting Director of the United States Patent and Trademark Office*